US008915818B2

(12) United States Patent
Gunji et al.

(10) Patent No.: US 8,915,818 B2
(45) Date of Patent: Dec. 23, 2014

(54) HUB BEARING, SPEED REDUCTION MECHANISM, AND IN-WHEEL MOTOR

(75) Inventors: Daisuke Gunji, Fujisawa (JP); Yasuyuki Matsuda, Fujisawa (JP)

(73) Assignee: NSK Ltd., Tokyo (JP)

( * ) Notice: Subject to any disclaimer, the term of this patent is extended or adjusted under 35 U.S.C. 154(b) by 44 days.

(21) Appl. No.: 13/824,903

(22) PCT Filed: Feb. 29, 2012

(86) PCT No.: PCT/JP2012/055109
§ 371 (c)(1),
(2), (4) Date: Apr. 29, 2013

(87) PCT Pub. No.: WO2013/018394
PCT Pub. Date: Feb. 7, 2013

(65) Prior Publication Data
US 2013/0217529 A1 Aug. 22, 2013

(30) Foreign Application Priority Data

Aug. 2, 2011 (JP) ................................. 2011-169091
Aug. 2, 2011 (JP) ................................. 2011-169092
Aug. 2, 2011 (JP) ................................. 2011-169151

(51) Int. Cl.
*F16H 48/20* (2012.01)
*B60K 17/04* (2006.01)

(52) U.S. Cl.
USPC ............ 475/150; 475/324; 475/325; 180/372

(58) Field of Classification Search
USPC ........... 475/150, 323, 324, 325; 180/371, 372
See application file for complete search history.

(56) References Cited

U.S. PATENT DOCUMENTS 1,427,584 A * 8/1922 Denison .......................... 74/390
3,439,766 A * 4/1969 Dence et al. .................. 180/308
3,770,074 A * 11/1973 Sherman ...................... 180/65.6
(Continued)

FOREIGN PATENT DOCUMENTS

| JP | 63-312511 A | 12/1988 |
|---|---|---|
| JP | 5-340449 A | 12/1993 |
| JP | 6-505938 A | 7/1994 |
| JP | 8-289501 A | 11/1996 |
| JP | 2002-186115 A | 6/2002 |

(Continued)

*Primary Examiner* — Roger Pang
(74) *Attorney, Agent, or Firm* — Sughrue Mion, PLLC

(57) ABSTRACT

There are provided a hub bearing, a speed reduction mechanism, and an in-wheel motor, including an inner race portion which is fixed to a support mechanism, an outer race portion which is connected to a wheel, and a rolling element which is disposed between the inner race portion and the outer race portion, and the outer race portion includes an outer race member, a wheel flange, and a fixation mechanism. The end surface of the wheel flange away from the outer race member in a direction parallel to a rotation shaft extends to the rotation shaft in relation to the inner race portion in the radial direction of the rotation shaft. Further, the inner race portion includes a first inner race member which is fixed to the support mechanism, a second inner race member which is inserted into the outer peripheral surface of the first inner race member, and a locking nut which is disposed on the outer peripheral surface of the first inner race member so as to be near the wheel in relation to the second inner race member and is threaded into the first inner race member, and the end surface of the locking nut away from the wheel in a direction parallel to the rotation shaft is positioned near the wheel in relation to the contact surface of the outer race member against the wheel flange.

16 Claims, 19 Drawing Sheets

(56) References Cited

U.S. PATENT DOCUMENTS

| | | | |
|---|---|---|---|
| 5,067,932 A | 11/1991 | Edwards | |
| 5,435,794 A | 7/1995 | Mori et al. | |
| 5,797,686 A * | 8/1998 | Kawamura et al. | 384/544 |
| 6,099,167 A * | 8/2000 | Goto et al. | 384/544 |
| 8,790,204 B2 * | 7/2014 | Gunji et al. | 475/5 |
| 2004/0080223 A1 | 4/2004 | Shimizu | |
| 2008/0036284 A1* | 2/2008 | Murata | 301/6.5 |
| 2008/0169141 A1* | 7/2008 | Suzuki | 180/65.7 |
| 2009/0236157 A1* | 9/2009 | Akamatsu | 180/55 |
| 2012/0190491 A1 | 7/2012 | Gunji et al. | |

FOREIGN PATENT DOCUMENTS

| | | |
|---|---|---|
| JP | 2002-247713 A | 8/2002 |
| JP | 2004-245409 A | 9/2004 |
| JP | 2005-81932 A | 3/2005 |
| JP | 2007-22386 A | 2/2007 |
| JP | 2007-331661 A | 12/2007 |
| JP | 2009-207235 A | 9/2009 |
| JP | 2009-292184 A | 12/2009 |
| JP | 2011-27130 A | 2/2011 |
| JP | 2011-58594 A | 3/2011 |
| WO | 2011/145726 A1 | 11/2011 |

* cited by examiner

HUB BEARING, SPEED REDUCTION MECHANISM, AND IN-WHEEL MOTOR

CROSS REFERENCE TO RELATED APPLICATIONS

This application is a National Stage of International Application No. PCT/JP2012/055109 filed Feb. 29, 2012, claiming priority based on Japanese Patent Application Nos. 2011-169091, 2011-169092, and 2011-169151 filed Aug. 2, 2011, the contents of all of which are incorporated herein by reference in their entirety.

TECHNICAL FIELD

The present invention relates to a hub bearing connected to a vehicle wheel, a speed reduction mechanism, and an in-wheel motor driving an electric vehicle.

BACKGROUND ART

Among electric vehicle driving devices, particularly an electric vehicle driving device which directly drives a wheel is called an in-wheel motor. The in-wheel motor mentioned herein is a driving device which is installed near a wheel provided in an electric vehicle. Furthermore, the in-wheel motor may not be necessarily accommodated inside the wheel. The in-wheel motor needs to be disposed inside the wheel or near the wheel. However, the inside of the wheel or the vicinity of the wheel is a comparatively narrow space. Accordingly, a decrease in size of the in-wheel motor is demanded.

Here, the in-wheel motor rotates a vehicle wheel by transmitting a generated driving force to the vehicle wheel. Patent Literature 1 discloses a mechanism which transmits a rotational driving force generated by a motor body to a wheel through a transmission member. The transmission member includes a driving shaft to which the driving force of the motor body is transmitted and a hub which transmits the driving force transmitted to the driving shaft to the wheel. The hub is a bearing, an outer race is connected to the driving shaft and the wheel, and an inner race is fixed to a motor casing.

As the in-wheel motor, a type with a speed reduction mechanism and a direct drive type without a speed reduction mechanism are known. The in-wheel motor of the type with the speed reduction mechanism may easily ensure a rotational force sufficient for driving the electric vehicle when starting the electric vehicle or climbing a slope (climbing a slope road). However, since the in-wheel motor of the type with the speed reduction mechanism transmits a rotational force to the wheel through the speed reduction mechanism, a friction loss occurs in the speed reduction mechanism. In the in-wheel motor with the speed reduction mechanism, the rotation speed of the output shaft of the motor is normally faster than the rotation speed of the wheel. Accordingly, in the in-wheel motor of the type with the speed reduction mechanism, particularly when the electric vehicle runs at a high speed, an energy loss increases due to a friction loss in the speed reduction mechanism.

On the other hand, since the in-wheel motor of the direct drive type transmits the rotational force to the wheel without through the speed reduction mechanism, the energy loss may be reduced. However, the in-wheel motor of the direct drive type may not amplify the rotational force by the speed reduction mechanism. Accordingly, the in-wheel motor of the direct drive type may not easily ensure a rotational force sufficient for driving the electric vehicle when the electric vehicle starts or climbs a slope. As a technique for ensuring a rotational force sufficient for driving the electric vehicle, for example, Patent Literature 2 discloses a technique which includes a speed reduction mechanism having a planetary gear mechanism and two motors instead of the in-wheel motor.

CITATION LIST

Patent Literature

Patent Literature 1: JP 2009-292184 A
Patent Literature 2: JP 2005-081932 A

SUMMARY OF INVENTION

Technical Problem

As illustrated in Patent Literature 1, the in-wheel motor may support the driving shaft and the wheel while the driving shaft and the wheel are rotatable with respect to the motor casing about the rotation shaft by fixing the inner race to the motor casing using the hub bearing. Accordingly, it is possible to decrease a load concerned with a connection portion between the driving shaft and the wheel, that is, the power transmission path. Here, since the structure of the hub bearing disclosed in Patent Literature 1 has a complex configuration, it is difficult to assemble the hub bearing.

The technique disclosed in Patent Literature 2 has a power circulation path. The technique disclosed in Patent Literature 2 first converts a rotational force into electric power in the power circulation path, and converts the electric power into a rotational force again. Accordingly, the technique disclosed in Patent Literature 2 needs to include a generator and a motor in the power circulation path. However, as described above, in the in-wheel motor, there is a demand for a decrease in size of the electric vehicle driving device, and hence it is difficult to ensure a space for installing the generator and the motor in the vicinity of the wheel. Further, the technique disclosed in Patent Literature 2 converts power into electric power, and further converts electric power into power. For this reason, the technique disclosed in Patent Literature 2 causes an energy loss when the energy is converted.

The invention is made in view of the above-described circumstance, and it is an object to provide a hub bearing which is easily assembled and attached to a transmission mechanism near a driving source and a wheel, a speed reduction mechanism, and an in-wheel motor capable of reducing an energy loss.

Solution to Problem

In order to solve the above described problem and achieve the object, according to the present invention, a hub bearing which is connected to a wheel and a support mechanism and supports the wheel to the support mechanism so as to be rotatable about a rotation shaft, the hub bearing includes: an inner race portion which is fixed to the support mechanism; an outer race portion which is connected to the wheel; and a rolling element which is disposed between the inner race portion and the outer race portion and supports the outer race portion and the inner race portion so as to be relatively rotatable about the rotation shaft, wherein the outer race portion includes an outer race member which comes into contact with the rolling element, a wheel flange which is connected to the wheel, and a fixation mechanism which fixes the outer race member to the wheel flange, wherein the inner race portion includes a first inner race member which is fixed to the support mechanism, a second inner race member which is inserted into the outer peripheral surface of the first inner race member, and a locking nut which is disposed on the outer peripheral surface of the first inner race member so as to be near the wheel in relation to the second inner race member and is threaded into the first inner race member, and wherein the end surface of the locking nut away from the wheel in a direction parallel to the rotation shaft is positioned near the wheel in relation to the contact surface of the outer race member against the wheel flange.

In order to solve the above described problem and achieve the object, according to the present invention, a hub bearing which is connected to a wheel and a support mechanism and supports the wheel to the support mechanism so as to be rotatable about a rotation shaft, the hub bearing includes: an inner race portion which is fixed to the support mechanism; an outer race portion which is connected to the wheel; and a rolling element which is disposed between the inner race portion and the outer race portion and supports the outer race portion and the inner race portion so as to be relatively rotatable about the rotation shaft, wherein the outer race portion includes an outer race member which comes into contact with the rolling element, a wheel flange which is connected to the wheel, and a fixation mechanism which fixes the outer race member to the wheel flange, and wherein the end surface of the wheel flange away from the outer race member in a direction parallel to the rotation shaft extends to the rotation shaft in relation to the inner race portion in the radial direction of the rotation shaft.

As a preferable aspect of the present invention, the fixation mechanism is a fixation bolt of which a shaft portion extends in a direction parallel to the rotation shaft.

As a preferable aspect of the present invention, in the wheel flange, a head portion of the fixation bolt is accommodated.

As a preferable aspect of the present invention, the wheel flange includes a convex protrusion portion which is provided in the contact surface against the outer race member so as to be directed to the outer race member.

As a preferable aspect of the present invention, the wheel flange is made of a material having a higher linear expansion coefficient than that of the outer race member, and the protrusion portion is formed at the inside in relation to the end portion of the contact surface in a direction perpendicular to the rotation shaft.

As a preferable aspect of the present invention, the hub bearing further includes: a plurality of fastening members which connects the wheel flange to the wheel, wherein the wheel flange is provided with a plurality of openings into which the fastening members are inserted, and a pitch circle diameter connecting the respective centers of the plurality of openings is smaller than a pitch circle diameter connecting the centers of the rolling elements in the radial direction perpendicular to the rotation shaft.

As a preferable aspect of the present invention, the fastening member is a stud bolt which extends in a direction parallel to the rotation shaft and of which a head portion is exposed to the surface of the wheel flange near the inner race portion.

In order to solve the above described problem and achieve the object, according to the present invention, a speed reduction mechanism includes: the hub bearing, a sun gear to which a driving force is transmitted from a driving source; and a pinion gear which meshes with the sun gear, wherein the wheel flange is a carrier which holds the pinion gear and rotates about the rotation shaft along with the pinion gear, and wherein the inner race portion is a ring gear which meshes with the pinion gear.

In order to solve the above described problem and achieve the object, according to the present invention, an in-wheel motor includes: the speed reduction mechanism; a transmission mechanism which is connected to the sun gear of the speed reduction mechanism and rotates the sun gear; and a driving source which includes at least one motor generating a driving force to rotate the transmission mechanism.

As a preferable aspect of the present invention, in the in-wheel motor, wherein the driving source includes a first motor and a second motor, wherein the transmission mechanism includes a first sun gear which is connected to the first motor, a first pinion gear which meshes with the first sun gear, a first carrier which holds the first pinion gear so that the first pinion gear rotates and the first pinion gear revolves about the first sun gear, a clutch device which regulates the rotation of the first carrier, a first ring gear which meshes with the first pinion gear and is connected to the second motor, a second sun gear which is connected to the first motor, a second pinion gear which meshes with the second sun gear, a third pinion gear which meshes with the second pinion gear, a second carrier which holds the second pinion gear and the third pinion gear so that the second pinion gear and the third pinion gear respectively rotate and the second pinion gear and the third pinion gear revolve about the second sun gear and is connected to the first ring gear, and a second ring gear which meshes with the third pinion gear and is connected to the sun gear of the speed reduction mechanism.

As a preferable aspect of the present invention, the in-wheel motor, wherein the driving source includes a first motor and a second motor, wherein the transmission mechanism includes a first sun gear which is connected to the first motor, a first pinion gear which meshes with the first sun gear, a first carrier which holds the first pinion gear so that the first pinion gear rotates and the first pinion gear revolve about the first sun gear, a first ring gear which meshes with the first pinion gear and is connected to the sun gear of the speed reduction mechanism, a second sun gear which is connected to the first motor, a second pinion gear which meshes with the second sun gear, a third pinion gear which meshes with the second pinion gear, a second carrier which holds the second pinion gear and the third pinion gear so that the second pinion gear and the third pinion gear respectively rotate and the second pinion gear and the third pinion gear revolve about the second sun gear, a clutch device which regulates the rotation of the second carrier, and a second ring gear which meshes with the third pinion gear, is connected to the first carrier, and is connected to the second motor.

According to the present invention, an in-wheel motor includes: a first motor; a second motor; a first sun gear which is connected to the first motor; a first pinion gear which meshes with the first sun gear; a first carrier which holds the first pinion gear so that the first pinion gear rotates and the first pinion gear revolves about the first sun gear; a clutch device which regulates the rotation of the first carrier; a first ring gear which meshes with the first pinion gear and is connected to the second motor; a second sun gear which is connected to the first motor; a second pinion gear which meshes with the second sun gear; a third pinion gear which meshes with the second pinion gear; a second carrier which holds the second pinion gear and the third pinion gear so that the second pinion gear and the third pinion gear respectively rotate and the second pinion gear and the third pinion gear revolve about the second sun gear and is connected to the first ring gear; a second ring gear which meshes with the third pinion gear; a third sun gear which is connected to the second ring gear; a fourth pinion gear which meshes with the third sun gear; a third carrier which holds the fourth pinion gear so that the fourth pinion gear rotates and the fourth pinion gear revolves about the third sun gear and is connected to the vehicle wheel of the electric vehicle, and a third ring gear which meshes with the fourth pinion gear and is fixed to a stationary system.

With the above-described configuration, the in-wheel motor may realize two speed change states, the first speed change state and the second speed change state. In the first speed change state, the first motor and the second motor are operated and the clutch device is the engagement state. When the in-wheel motor is in the first speed change state, a part of the rotational force returns from the second carrier to the first ring gear, and further the rotational force transmitted to the first ring gear is transmitted to the second sun gear through the first sun gear. That is, the rotational force is circulated in the in-wheel motor. With such a structure, the in-wheel motor may realize the larger speed change ratio. That is, in the first speed change state, the in-wheel motor may transmit the rotational force which is larger than the rotational force output from the first motor to the wheel.

In the second speed change state, the first motor and the second motor are operated, and the clutch device is the non-engagement state. In the second speed change state, the in-wheel motor may continuously change the speed change ratio by changing the angular velocity of the second motor. With such a configuration, since the in-wheel motor may reduce a difference between the angular velocity of the first motor and the angular velocity of the second ring gear as the output shaft, the friction loss may be reduced, and hence the energy loss may be reduced.

Further, the in-wheel motor includes the speed reduction mechanism including the third sun gear, the fourth pinion gear, the third carrier, and the third ring gear. Since the in-wheel motor may amplify the rotational forces of the first motor and the second motor by the speed reduction mechanism, the rotational force demanded in the first motor and the second motor may be reduced. As a result, since the first motor and the second motor may be decreased in size and weight, the in-wheel motor may be decreased in size and weight.

The invention provides an in-wheel motor including: a first motor; a second motor; a first sun gear which is connected to the first motor; a first pinion gear which meshes with the first sun gear; a first carrier which holds the first pinion gear so that the first pinion gear rotates and the first pinion gear revolves about the first sun gear; a first ring gear which meshes with the first pinion gear; a second sun gear which is connected to the first motor; a second pinion gear which meshes with the second sun gear; a third pinion gear which meshes with the second pinion gear; a second carrier which holds the second pinion gear and the third pinion gear so that the second pinion gear and the third pinion gear respectively rotate and the second pinion gear and the third pinion gear revolve about the second sun gear; a clutch device which regulates the rotation of the second carrier; a second ring gear which meshes with the third pinion gear, is connected to the first carrier, and is connected to the second motor; a third sun gear which is connected to the first ring gear; a fourth pinion gear which meshes with the third sun gear; a third carrier which holds the fourth pinion gear so that the fourth pinion gear rotates and the fourth pinion gear revolves about the third sun gear and is connected to a vehicle wheel of an electric vehicle; and a third ring gear which meshes with the fourth pinion gear and is fixed to a stationary system.

With the above-described configuration, the in-wheel motor may realize two speed change states, the first speed change state and the second speed change state. In the first speed change state, the first motor and the second motor are operated and the clutch device is the engagement state. When the in-wheel motor is in the first speed change state, a part of the rotational force returns from the first carrier to the second ring gear, and further the rotational force transmitted to the second ring gear is transmitted to the first sun gear through the second sun gear. That is, the rotational force is circulated in the in-wheel motor. With such a structure, the in-wheel motor may realize the larger speed change ratio. That is, in the first speed change state, the in-wheel motor may transmit the rotational force which is larger than the rotational force output from the first motor to the wheel.

In the second speed change state, the first motor and the second motor are operated, and the clutch device is the non-engagement state. In the second speed change state, the in-wheel motor may continuously change the speed change ratio by changing the angular velocity of the second motor. With such a configuration, since the in-wheel motor may reduce a difference between the angular velocity of the first motor and the angular velocity of the second ring gear as the output shaft, the friction loss may be reduced, and hence the energy loss may be reduced.

Further, the in-wheel motor includes the speed reduction mechanism including the third sun gear, the fourth pinion gear, the third carrier, and the third ring gear. Since the in-wheel motor may amplify the rotational forces of the first motor and the second motor by the speed reduction mechanism, the rotational force demanded in the first motor and the second motor may be reduced. As a result, since the first motor and the second motor may be decreased in size and weight, the in-wheel motor may be decreased in size and weight.

In the invention, the clutch device may be an one-way clutch device including a first member, a second member which is rotatable with respect to the first member, and an engagement member which transmits a rotational force between the first member and the second member when a rotational force acts on the second member in a first direction and does not transmit a rotational force between the first member and the second member when a rotational force acts on the second member in a second direction opposite to the first direction.

The one-way clutch device may switch the engagement state and the non-engagement state by changing the direction of the rotational force acting on the second member. Accordingly, the one-way clutch device does not need a mechanism for moving a piston or an electromagnetic actuator. Accordingly, the in-wheel motor according to the invention may decrease the number of components, and may decrease itself (the clutch device) in size. Further, the one-way clutch device does not need a mechanism for moving the piston or energy for operating the electromagnetic actuator.

In the invention, the one-way clutch device may be disposed in an engagement direction when the first motor rotates in a direction in which the electric vehicle equipped with the in-wheel motor advances and the second motor is not driven. With such a configuration, the first speed change state may be set to a so-called low gear, and the second speed change state may be set to a so-called high gear.

In the invention, the clutch device may be a sprag type one-way clutch. In the sprag type one-way clutch, since a sprag is used as a friction engagement member, and hence a plurality of sprags may be arranged as many as the number larger than the number of the cams each having a substantially circular bottom surface in the clutch device. As a result, the torque capacity of the clutch device may be made to be larger than the torque capacity of the cam clutch device having the same attachment dimension as that of the clutch device.

Advantageous Effects of Invention

The invention may provide a hub bearing which is easily assembled and attached to a transmission mechanism near a driving source and a wheel, a speed reduction mechanism, and an in-wheel motor capable of reducing an energy loss.

BRIEF DESCRIPTION OF DRAWINGS

FIG. 19-1 is a perspective view illustrating a first magnetic pattern ring and a second magnetic pattern ring.

FIG. 19-2 is a cross-sectional view of A-A of FIG. 19-1.

FIG. 19-3 is a perspective view illustrating an arrangement of a magnetic detector.

DESCRIPTION OF EMBODIMENTS

Figure 1:
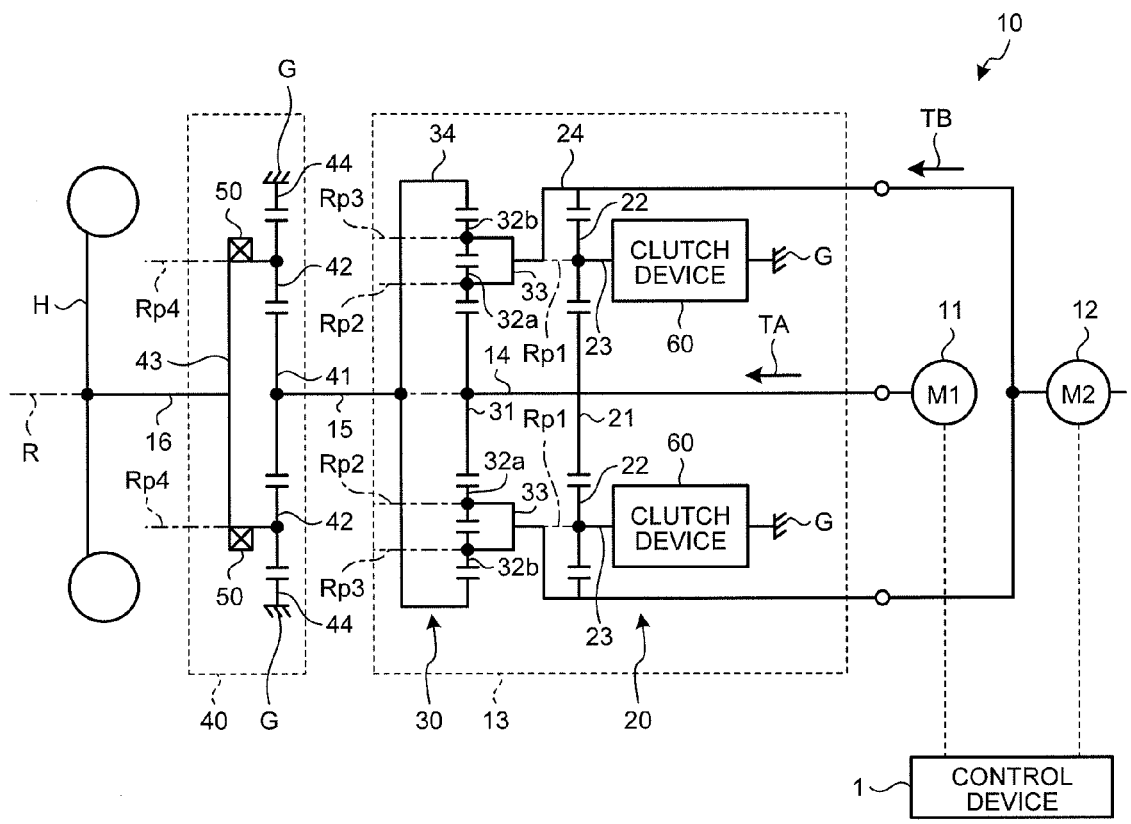
FIG. 1 is a diagram illustrating a configuration of an electric vehicle driving device of an embodiment.

A mode for carrying out the invention (an embodiment) will be described in detail by referring to the drawings. The invention is not limited by the contents to be described in the embodiment below. Further, the components described below include a component which may be easily supposed by the person skilled in the art, the substantially identical component, and the equivalent component. Further, the components described below may be appropriately combined with each other. Further, various omissions, substitutions, or modifications of the components may be made without departing from the spirit of the invention.

FIG. 1 is a diagram illustrating a configuration of an electric vehicle driving device of the embodiment. An electric vehicle driving device 10 serving as an in-wheel motor includes a casing G, a first motor 11, a second motor 12, a speed change mechanism 13, a speed reduction mechanism 40, and a wheel bearing (a hub bearing) 50. The casing G accommodates the first motor 11, the second motor 12, the speed change mechanism 13, and the speed reduction mechanism 40.

The first motor 11 may output a first rotational force TA. The second motor 12 may output a second rotational force TB. The speed change mechanism 13 is connected to the first motor 11. With such a structure, when the first motor 11 is operated, the first rotational force TA is transmitted (input) from the first motor 11 to the speed change mechanism 13. Further, the speed change mechanism 13 is connected to the second motor 12. With such a structure, when the second motor 12 is operated, the second rotational force TB is transmitted (input) to the speed change mechanism 13. The operation of the motor mentioned herein indicates that electric power is supplied to the first motor 11 (the second motor 12) and the input-and-output shafts of the first motor 11 (the second motor 12) rotate.

The speed change mechanism 13 may change a speed reduction ratio (a ratio $\omega i/\omega o$ between the input rotation speed $\omega i$ to the speed change mechanism 13 and the output rotation speed $\omega o$). The speed change mechanism 13 includes a first planetary gear mechanism 20, a second planetary gear mechanism 30, and a clutch device 60. The first planetary gear mechanism 20 is a single pinion type planetary gear mechanism. The first planetary gear mechanism 20 includes a first sun gear 21, a first pinion gear 22, a first carrier 23, and a first ring gear 24. The second planetary gear mechanism 30 is a double pinion type planetary gear mechanism. The second planetary gear mechanism 30 includes a second sun gear 31, a second pinion gear 32a, a third pinion gear 32b, a second carrier 33, and a second ring gear 34.

The first sun gear 21 is supported inside the casing G so as to rotate (turn) about the rotation shaft R. The first sun gear 21 is connected to the first motor 11. With such a structure, when the first motor 11 is operated, the first rotational force TA is transmitted to the first sun gear 21. Then, when the first motor 11 is operated, the first sun gear 21 rotates about the rotation shaft R. The first pinion gear 22 meshes with the first sun gear 21. The first carrier 23 holds the first pinion gear 22 so that the first pinion gear 22 rotates (turns) about a first pinion rotation shaft Rp1. The first pinion rotation shaft Rp1 is parallel to, for example, the rotation shaft R.

The first carrier 23 is supported inside the casing G so as to rotate (turn) about the rotation shaft R. With such a structure, the first carrier 23 holds the first pinion gear 22 so that the first pinion gear 22 revolves about the first sun gear 21, that is, the rotation shaft R. The first ring gear 24 may rotate (turn) about the rotation shaft R. The first ring gear 24 meshes with the first pinion gear 22. Further, the first ring gear 24 is connected to the second motor 12. With such a structure, when the second motor 12 is operated, the second rotational force TB is transmitted to the first ring gear 24. Then, when the second motor 12 is operated, the first ring gear 24 rotates (turns) about the rotation shaft R.

The clutch device 60 is disposed between the casing G and the first carrier 23. The clutch device 60 may regulate the rotation of the first carrier 23. Specifically, the clutch device 60 may switch the case where the rotation of the first carrier 23 about the rotation shaft R is regulated (braked) and the case where the rotation is permitted. Hereinafter, the state where the clutch device 60 regulates (brakes) the rotation is referred to as an engagement state, and the state where the rotation is permitted is referred to as a non-engagement state. The clutch device 60 will be specifically described below.

In this way, the first carrier 23 may engage with and separate from the casing G by the clutch device 60. That is, the clutch device 60 may allow the first carrier 23 to be rotatable with respect to the casing G or may allow the first carrier 23 not to be rotatable with respect to the casing G.

The second sun gear 31 is supported inside the casing G so as to rotate (turn) about the rotation shaft R. The second sun gear 31 is connected to the first motor 11 through the first sun gear 21. Specifically, the first sun gear 21 and the second sun gear 31 are integrally formed with the sun gear shaft 14 so as to respectively rotate about the same shaft (the rotation shaft R). Then, the sun gear shaft 14 is connected to the first motor 11. With such a structure, when the first motor 11 is operated, the second sun gear 31 rotates about the rotation shaft R.

The second pinion gear 32a meshes with the second sun gear 31. The third pinion gear 32b meshes with the second pinion gear 32a. The second carrier 33 holds the second pinion gear 32a so that the second pinion gear 32a rotates (turns) about the second pinion rotation shaft Rp2. Further, the second carrier 33 holds the third pinion gear 32b so that the third pinion gear 32b rotates (turns) about the third pinion rotation shaft Rp3. The second pinion rotation shaft Rp2 and the third pinion rotation shaft Rp3 are parallel to, for example, the rotation shaft R.

The second carrier 33 is supported inside the casing G so as to rotate (turn) about the rotation shaft R. With such a structure, the second carrier 33 holds the second pinion gear 32a and the third pinion gear 32b so that the second pinion gear 32a and the third pinion gear 32b revolve about the second sun gear 31, that is, the rotation shaft R. Further, the second carrier 33 is connected to the first ring gear 24. With such a structure, when the first ring gear 24 rotates (turns), the second carrier 33 rotates (turns) about the rotation shaft R. The second ring gear 34 may rotate (turn) about the rotation shaft R. The second ring gear 34 meshes with the third pinion gear 32b. Further, the second ring gear 34 is connected to an input-and-output shaft (the speed change mechanism input-and-output shaft) 15 of the speed change mechanism 13. With such a structure, when the second ring gear 34 rotates (turns), the speed change mechanism input-and-output shaft 15 rotates.

The speed reduction mechanism 40 is disposed between the speed change mechanism 13 and the vehicle wheel H of the electric vehicle. Then, the speed reduction mechanism 40 reduces the rotation speed of the speed change mechanism input-and-output shaft 15, and outputs the result to an input-and-output shaft (a speed reduction mechanism input-and-output shaft) 16. The speed reduction mechanism input-and-output shaft 16 is connected to the vehicle wheel H of the electric vehicle, and transmits power between the speed reduction mechanism 40 and the vehicle wheel H. With such a structure, the power which is generated in at least one of the first motor 11 and the second motor 12 is transmitted to the vehicle wheel H through the speed change mechanism 13 and the speed reduction mechanism 40 and drives the vehicle wheel. Further, the input from the vehicle wheel H is transmitted to at least one of the first motor 11 and the second motor 12 through the speed reduction mechanism 40 and the speed change mechanism 13. In this case, at least one of the first motor 11 and the second motor 12 may generate electric power (perform regeneration) by being driven by the vehicle wheel H.

The speed reduction mechanism 40 includes a third sun gear 41, a fourth pinion gear 42, a third carrier 43, and a third ring gear 44. The speed change mechanism input-and-output shaft 15 is attached to the third sun gear 41. With such a structure, the third sun gear 41 and the second ring gear 34 of the speed change mechanism 13 are connected to each other through the speed change mechanism input-and-output shaft 15. The fourth pinion gear 42 meshes with the third sun gear 41. The third carrier 43 holds the fourth pinion gear 42 so that the fourth pinion gear 42 may turn about the fourth pinion rotation shaft Rp4 and the fourth pinion gear 42 may revolve about the third sun gear 41. The third ring gear 44 meshes with the fourth pinion gear 42, and is fixed to a stationary system (in the embodiment, the casing G). The third carrier 43 is connected to the vehicle wheel H through the speed reduction mechanism input-and-output shaft 16. Further, the third carrier 43 is supported by a wheel bearing 50 so as to be rotatable.

The electric vehicle driving device 10 interposes the speed reduction mechanism 40 between the speed change mechanism 13 and the vehicle wheel H, reduces the rotation speed of the speed change mechanism input-and-output shaft 15 of the speed change mechanism 13, and drives the vehicle wheel H. For this reason, the first motor 11 and the second motor 12 may obtain a driving force necessary for the electric vehicle even when the maximum rotational force is small. As a result, the first motor 11 and the second motor 12 may be decreased in size and weight while decreasing the driving current. Then, a decrease in the production cost and a decrease in the weight of the electric vehicle driving device 10 may be realized.

The control device 1 controls the operation of the electric vehicle driving device 10. More specifically, the control device 1 controls the rotation speeds, the rotation directions, and the outputs of the first motor 11 and the second motor 12. The control device 1 is, for example, a microcomputer. Next, the rotational force transmission path of the electric vehicle driving device 10 will be described.

Figure 2:
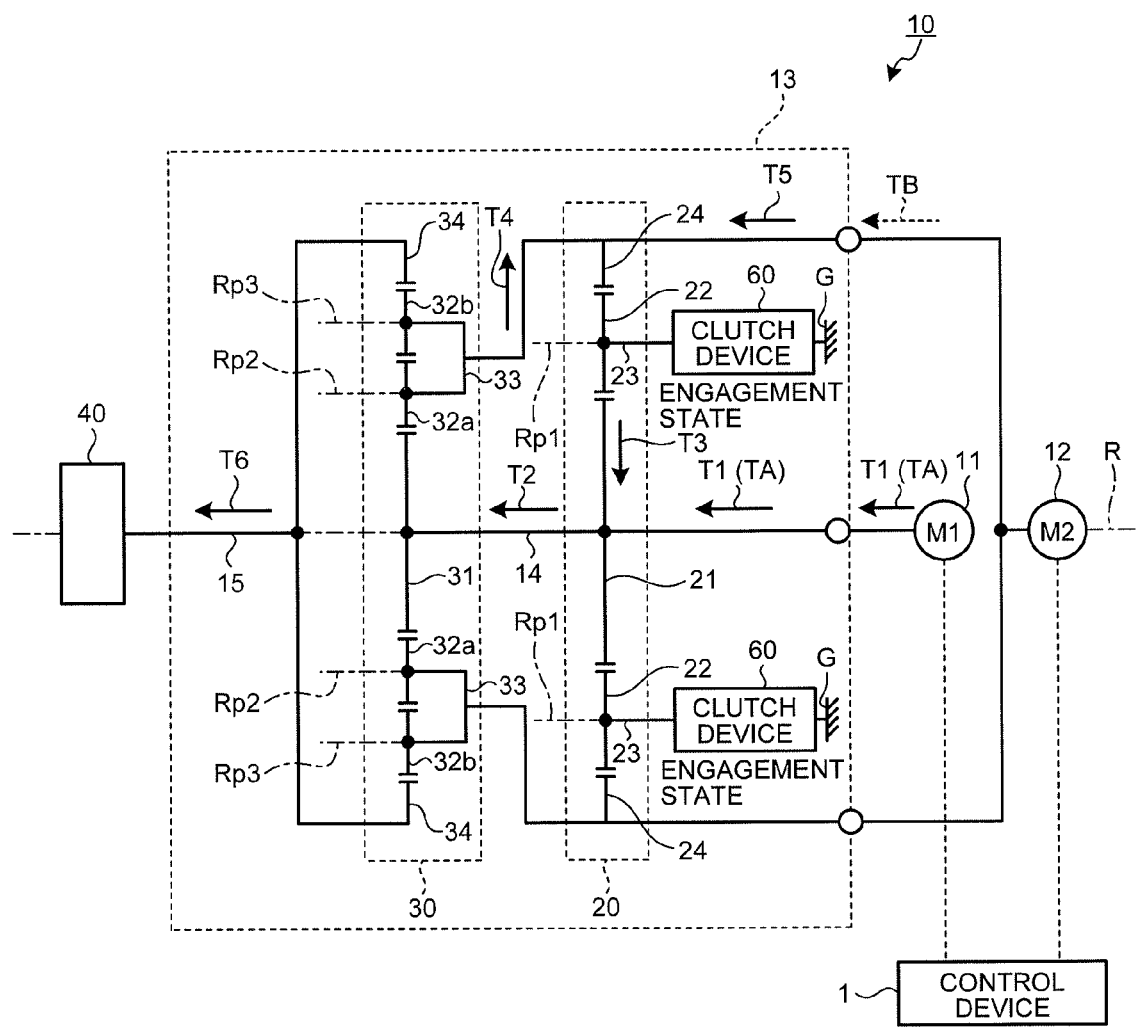
FIG. 2 is a diagram illustrating a path where a rotational force is transmitted in a case where the electric vehicle driving device according to the embodiment is in a first speed change state.

FIG. 2 is a diagram illustrating a path where the rotational force is transmitted in a case where the electric vehicle driving device according to the embodiment is in a first speed change state. The electric vehicle driving device 10 may realize two speed change states of the first speed change state and the second speed change state. First, a case in which the electric vehicle driving device 10 realizes the first speed change state will be described.

The first speed change state is a so-called low gear state, and a large speed reduction ratio may be obtained. That is, the torque of the speed change mechanism input-and-output shaft 15 may be increased. The first speed change state is mainly used in a case where a large driving force is needed when the electric vehicle runs at the time of, for example, starting the vehicle on a slope or climbing a slope (climbing on a slope road). In the first speed change state, the first motor 11 and the second motor 12 are both operated, but the torque directions are opposite to each other. The power of the first motor 11 is input to the first sun gear 21, and the power of the second motor 12 is input to the first ring gear 24. In the first speed change state, the clutch device 60 is in an engagement state. That is, in the first speed change state, the first carrier 23 may not rotate with respect to the casing G.

In the first speed change state, the rotational force which is output from the first motor 11 is set as a first rotational force T1, and the rotational force which is output from the second motor 12 is set as a second rotational force T5. The respective rotational forces of the first rotational force T1, the circulation rotational force T3, the synthetic rotational force T2, the first distributed rotational force T6, and the second distributed rotational force T4 illustrated in FIG. 2 indicate torques acting on respective portions, and the unit thereof is Nm.

The first rotational force T1 which is output from the first motor 11 is input to the first sun gear 21. Then, the first rotational force T1 is added to the circulation rotational force T3 in the first sun gear 21, and becomes the synthetic rotational force T2. The synthetic rotational force T2 is output from the first sun gear 21. The circulation rotational force T3 is a rotational force which may be transmitted from the first ring gear 24 to the first sun gear 21. The circulation rotational force T3 will be described in detail later.

The first sun gear 21 and the second sun gear 31 are connected to each other by the sun gear shaft 14. For this reason, in the first speed change state, the synthetic rotational force T2 which is obtained by synthesizing the first rotational force T1 and the circulation rotational force T3 and is output from the first sun gear 21 may be transmitted to the second sun gear 31 through the sun gear shaft 14. The synthetic rotational force T2 is amplified by the second planetary gear mechanism 30. Further, the synthetic rotational force T2 is distributed as the first distributed rotational force T6 and the second distributed rotational force T4 by the second planetary gear mechanism 30. The first distributed rotational force T6 is the rotational force in which the synthetic rotational force T2 is distributed to the second ring gear 34 and is amplified, and is output from the speed change mechanism input-and-output shaft 15. The second distributed rotational force T4 is the rotational force in which the synthetic rotational force T2 is distributed to the second carrier 33 and is amplified.

The first distributed rotational force T6 is output from the speed change mechanism input-and-output shaft 15 to the speed reduction mechanism 40. Then, the first distributed rotational force T6 is amplified in the speed reduction mechanism 40, is output to the vehicle wheel H through the speed reduction mechanism input-and-output shaft 16 illustrated in FIG. 1, and drives the vehicle wheel. As a result, the electric vehicle runs.

Since the second carrier 33 and the first ring gear 24 rotate together, the second distributed rotational force T4 which is distributed to the second carrier 33 becomes the circulation rotational force of the first ring gear 24. Then, the second distributed rotational force T4 is synthesized with the second rotational force T5 of the second motor 12 using the first ring gear 24, and is directed to the first planetary gear mechanism 20. The direction of the second rotational force T5, that is, the rotational force of the second motor 12 is opposite to the direction of the rotational force of the first motor 11.

As for the second distributed rotational force T4 and the second rotational force T5 of the first ring gear 24 returned to the first planetary gear mechanism 20, the magnitudes are reduced and the force directions are reversed by the first planetary gear mechanism 20, and hence the forces become the circulation rotational force T3 in the first sun gear 21. In this way, since the power (the rotational force) is circulated between the first planetary gear mechanism 20 and the second planetary gear mechanism 30, the speed change mechanism 13 may increase the speed reduction ratio. That is, the electric vehicle driving device 10 may generate a large torque in the first speed change state. Next, an example of the values of the synthetic rotational force T2, the circulation rotational force T3, the second distributed rotational force T4, and the first distributed rotational force T6 will be described.

The number of teeth of the second sun gear 31 is denoted by Z1, the number of teeth of the second ring gear 34 is denoted by Z4, the number of teeth of the first sun gear 21 is denoted by Z5, and the number of teeth of the first ring gear 24 is denoted by Z7. In Equation (1) to Equation (4), the rotational forces (the synthetic rotational force T2, the circulation rotational force T3, the second distributed rotational force T4, and the first distributed rotational force T6 illustrated in FIG. 2) acting on the respective portions of the electric vehicle driving device 10 are illustrated. Furthermore, a negative value is obtained in Equation (1) to Equation (4) below in the case of the rotational force acting in the direction opposite to that of the first rotational force T1.

$$T2 = \frac{\frac{Z7}{Z5}}{\frac{Z7}{Z5} - \frac{Z4}{Z1} + 1} \times T1 - \frac{1}{\frac{Z7}{Z5} - \frac{Z4}{Z1} + 1} \times T5 \quad (1)$$

$$T3 = \frac{\frac{Z4}{Z1} - 1}{\frac{Z7}{Z5} - \frac{Z4}{Z1} + 1} \times T1 - \frac{1}{\frac{Z7}{Z5} - \frac{Z4}{Z1} + 1} \times T5 \quad (2)$$

$$T4 = \frac{\frac{Z7}{Z5} \times \left(1 - \frac{Z4}{Z1}\right)}{\frac{Z7}{Z5} - \frac{Z4}{Z1} + 1} \times T1 + \frac{\frac{Z7}{Z5}}{\frac{Z7}{Z5} - \frac{Z4}{Z1} + 1} \times T5 \quad (3)$$

$$T6 = \frac{\frac{Z4}{Z1} \times \frac{Z7}{Z5}}{\frac{Z7}{Z5} - \frac{Z4}{Z1} + 1} \times T1 - \frac{\frac{Z4}{Z1}}{\frac{Z7}{Z5} - \frac{Z4}{Z1} + 1} \times T5 \quad (4)$$

As an example, the number of teeth Z1 is set to 47, the number of teeth Z4 is set to 97, the number of teeth Z5 is set to 24, and the number of teeth Z7 is set to 76. Further, the first rotational force T1 is set to 50 Nm, and the second rotational force T5 is set to 50 Nm. Then, the synthetic rotational force T2 becomes 99.1 Nm, the circulation rotational force T3 becomes 49.1 Nm, the second distributed rotational force T4 becomes −105.4 Nm, and the first distributed rotational force T6 becomes 204.5 Nm. In this way, as an example, the electric vehicle driving device 10 may amplify the first rotational force T1 output from the first motor 11 four times and outputs the result to the vehicle wheel H. Next, a case in which the electric vehicle driving device 10 realizes the second speed change state will be described.

Figure 3:
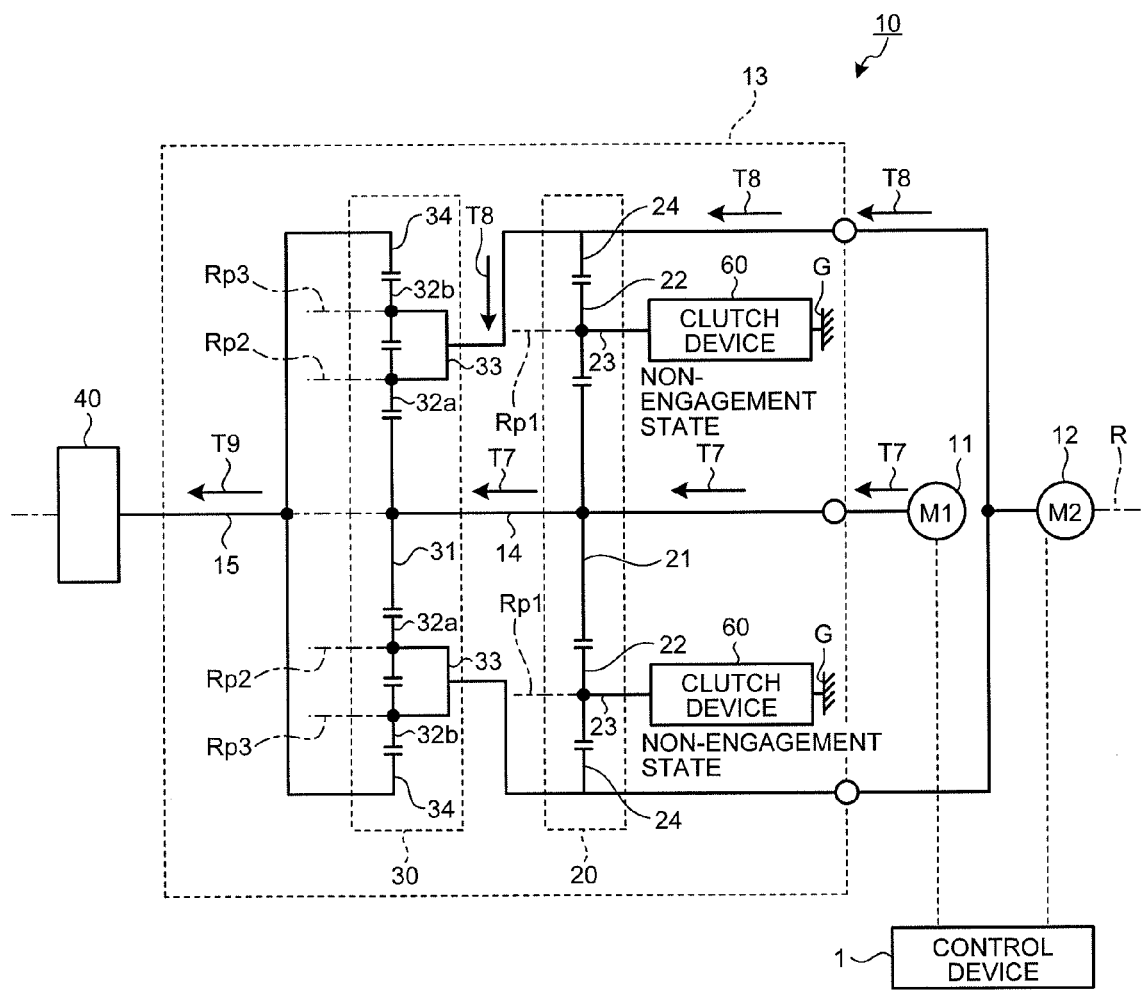
FIG. 3 is a diagram illustrating a path where a rotational force is transmitted in a case where the electric vehicle driving device according to the embodiment is in a second speed change state.

FIG. 3 is a diagram illustrating a path where the rotational force is transmitted in a case where the electric vehicle driving device according to the embodiment is in the second speed change state. The second speed change state is a so-called high gear state, and may obtain a small speed reduction ratio. That is, the torque of the speed change mechanism input-and-output shaft 15 is small, but the friction loss of the speed change mechanism 13 may be decreased. In the second speed change state, the first motor 11 and the second motor 12 are both operated. Then, the directions of the torques generated by the first motor 11 and the second motor 12 become equal to each other. In the second speed change state, the rotational force output from the first motor 11 is set as the first rotational force T7, and the rotational force output from the second motor 12 is set as the second rotational force T8.

In the second speed change state, the power of the first motor 11 is input to the first sun gear 21, and the power of the second motor 12 is input to the first ring gear 24. In the second speed change state, the clutch device 60 is in a non-engagement state. That is, in the second speed change state, the first carrier 23 may rotate with respect to the casing G. As a result, in the second speed change state, the circulation of the rotational force between the first planetary gear mechanism 20 and the second planetary gear mechanism 30 is interrupted. Further, in the second speed change state, the first carrier 23 may freely revolve (rotate), and hence may freely rotate (turn) relative to the first sun gear 21 and the first ring gear 24. Furthermore, the synthetic rotational force T9 illustrated in FIG. 3 indicates a torque which is output from the speed change mechanism input-and-output shaft 15 and is transmitted to the speed reduction mechanism 40, and the unit thereof is Nm.

The first rotational force T7 is added to the second rotational force T8 in the second carrier 33. As a result, the synthetic rotational force T9 is transmitted to the second ring gear 34. The first rotational force T7, the second rotational force T8, and the synthetic rotational force T9 satisfy Equation (5) below.

$$T9 = T7 + T8 \quad (5)$$

The angular velocity (the rotation speed) of the speed change mechanism input-and-output shaft 15 is defined by the angular velocity of the second sun gear 31 driven by the first motor 11 and the angular velocity of the second carrier 33 driven by the second motor 12. Accordingly, even when the angular velocity of the speed change mechanism input-and-output shaft 15 is made uniform, the combination between the angular velocity of the first motor 11 and the angular velocity of the second motor 12 may be changed.

In this way, since the combination of the angular velocity of the speed change mechanism input-and-output shaft 15, the angular velocity of the first motor 11, and the angular velocity of the second motor 12 is not uniquely defined, the first speed change state may be continuously changed to the second speed change state or the second speed change state may be continuously changed to the first speed change state. Accordingly, when the control device 1 continuously and smoothly controls the angular velocity of the first motor 11, the angular velocity of the second motor 12, and the rotational force, even when the state of the speed change mechanism 13 changes between the first speed change state and the second speed change state, a so-called speed change shock may be reduced.

In the second speed change state, the speed change mechanism 13 rotates (turns) in the same direction as those of the first sun gear 21 and the first ring gear 24, and hence rotates (turns) in the same direction as those of the second sun gear 31 and the second carrier 33. When the angular velocity of the second sun gear 31 is made uniform, the angular velocity of the second ring gear 34 becomes faster as the angular velocity of the second carrier 33 becomes faster. Further, the angular velocity of the second ring gear 34 becomes slower as the angular velocity of the second carrier 33 becomes slower. In this way, the angular velocity of the second ring gear 34 continuously changes due to the angular velocity of the second sun gear 31 and the angular velocity of the second carrier 33. That is, the electric vehicle driving device 10 may continuously change the speed change ratio by changing the angular velocity of the second rotational force T8 output from the second motor 12.

Further, the electric vehicle driving device 10 has a plurality of combinations of the angular velocity of the first rotational force T7 output from the first motor 11 and the angular velocity of the second rotational force T8 output from the second motor 12 when making the angular velocity of the second ring gear 34 uniform. That is, even when the angular velocity of the first rotational force T7 output from the first motor 11 changes due to a change in the angular velocity of the second rotational force T8 output from the second motor 12, the angular velocity of the second ring gear 34 may be maintained uniformly. For this reason, the electric vehicle driving device 10 may reduce a change amount of the angular velocity of the second ring gear 34 when the first speed change state changes to the second speed change state. As a result, the electric vehicle driving device 10 may reduce the speed change shock.

Next, the second rotational force T8 output from the second motor 12 will be described. The second motor 12 needs to output a rotational force equal to or larger than the second rotational force T8 satisfying Equation (6). Furthermore, in Equation (6), 1−(Z4/Z1) indicates a rotational force ratio between the second sun gear 31 and the second ring gear 34.

$$T8 = \left(1 - \frac{Z4}{Z1}\right) \times T7 \quad (6)$$

Accordingly, in order to adjust the rotational force and the angular velocity of the second ring gear 34 when arbitrarily rotating the first motor 11, the first rotational force TA, the second rotational force TB, the number of teeth Z1, and the number of teeth Z4 may satisfy Equation (7) below. Furthermore, the first rotational force TA is the rotational force of the arbitrary angular velocity of the first motor 11, and the second rotational force TB is the rotational force of the arbitrary angular velocity of the second motor 12.

[Equation 7]

$$\frac{TB}{TA} = \left|1 - \frac{Z4}{Z1}\right| \quad (7)$$

Next, the clutch device 60 will be described. The clutch device 60 is, for example, a one-way clutch device. The one-way clutch device transmits only the rotational force in the first direction, and does not transmit the rotational force in the second direction opposite to the first direction. That is, the one-way clutch device becomes an engagement state when the first carrier 23 illustrated in FIGS. 1 to 3 rotates in the first direction, and becomes a non-engagement state when the first carrier 23 rotates in the second direction. The one-way clutch device is, for example, a cam clutch device or a roller clutch device. Hereinafter, the configuration of the clutch device 60 will be described on the assumption that the clutch device 60 is the cam clutch device.

Figure 4:
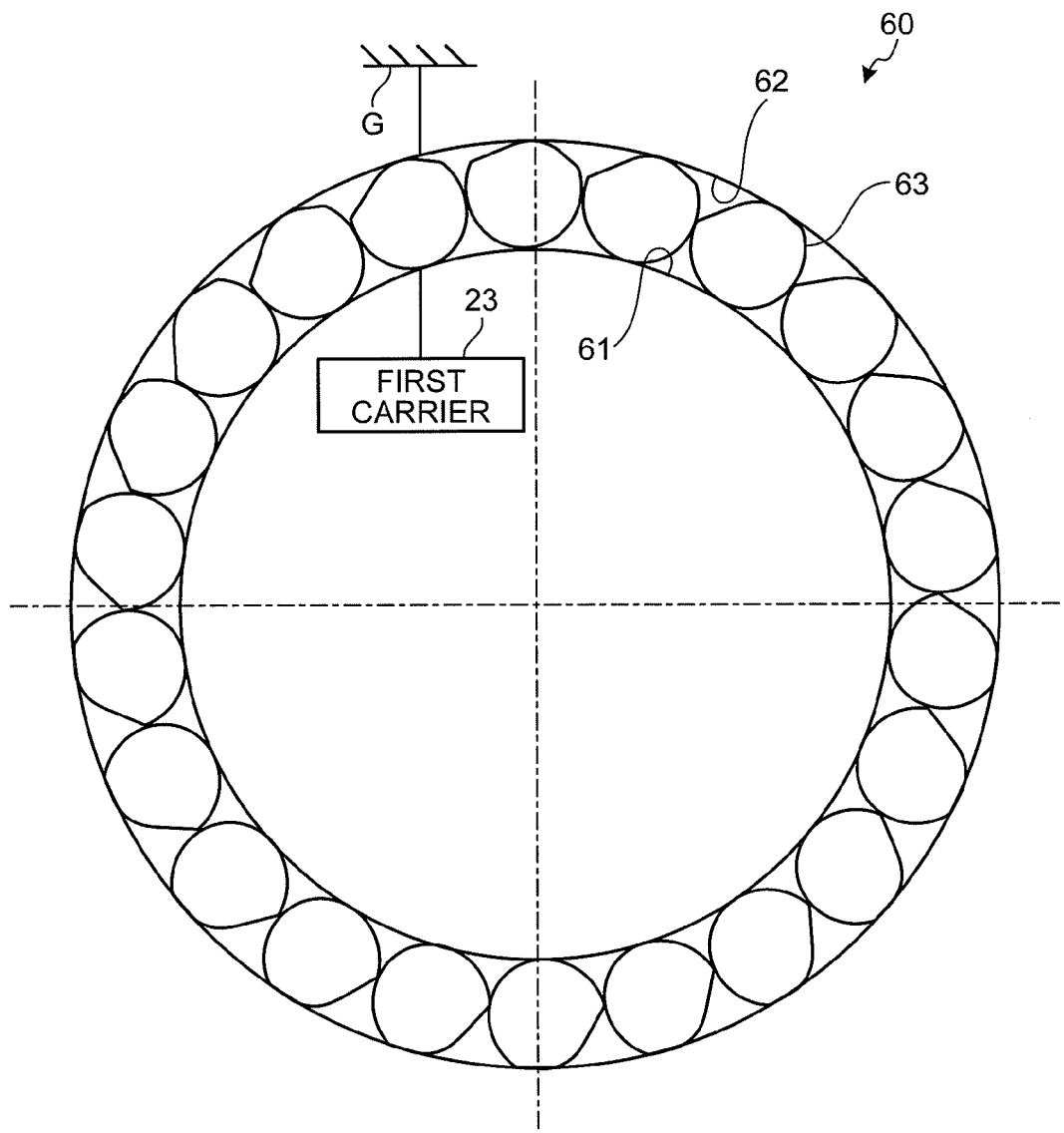
FIG. 4 is a diagram illustrating a clutch device of the embodiment.
Figure 5:
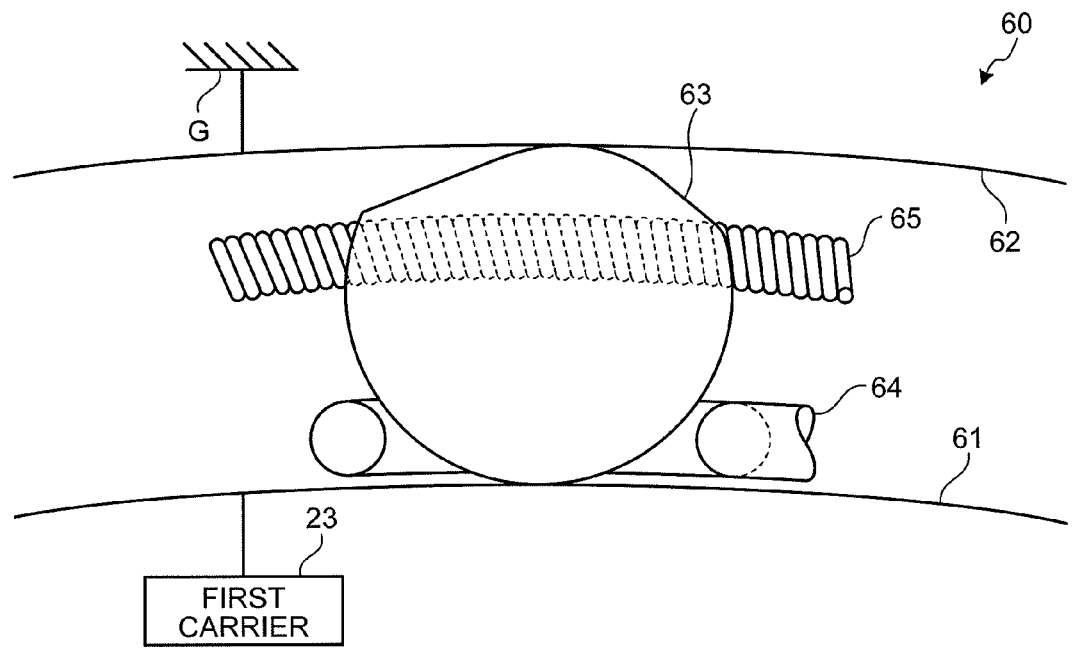
FIG. 5 is an enlarged diagram illustrating a cam of the clutch device of the embodiment.

FIG. 4 is a diagram illustrating the clutch device of the embodiment. FIG. 5 is an enlarged diagram illustrating the cam of the clutch device of the embodiment. As illustrated in FIG. 4, the clutch device 60 includes an inner race 61 which serves as a second member, an outer race 62 which serves as a first member, and a cam 63 which serves as an engagement member. Furthermore, the inner race 61 may serve as the first member, and the outer race 62 may serve as the second member. The inner race 61 and the outer race 62 are cylindrical members. The inner race 61 is disposed inside the outer race 62. One of the inner race 61 and the outer race 62 is connected to the first carrier 23, and the other thereof is connected to the casing G. In the embodiment, the inner race 61 is connected to the first carrier 23, and the outer race 62 is connected to the casing G. The cam 63 is a substantially columnar bar-like member. However, the cross-sectional shape of the cam 63 which is cut in the imaginary plane perpendicular to the axis of the bar-like member is not a true circular shape, but a distorted shape. The plurality of cams 63 are installed along the circumferential direction of the inner race 61 and the outer race 62 between the outer peripheral portion of the inner race 61 and the inner peripheral portion of the outer race 62.

As illustrated in FIG. 5, the clutch device 60 includes a wire gauge 64 and a garter spring 65. The wire gauge 64 is an elastic member. The wire gauge 64 assembles the plurality of cams 63 so that the cams are not scattered. The garter spring 65 applies a force to the cam 63 so that the cam 63 normally comes into contact with the inner race 61 and the outer race 62. Accordingly, when the rotational force acts on the inner race 61 or the outer race 62, the cam 63 may promptly mesh with the inner race 61 and the outer race 62. Accordingly, the clutch device 60 may shorten a time necessary for changing the non-engagement state to the engagement state. Furthermore, in the non-engagement state, no force is transmitted between the inner race 61 and the outer race 62. Further, in the engagement state, a force is transmitted between the inner race 61 and the outer race 62.

In the clutch device 60, the cam 63 meshes with the inner race 61 and the outer race 62 when the rotational force in the first direction acts on the inner race 61. Accordingly, a rotational force is transmitted between the inner race 61 and the outer race 62, and the first carrier 23 receives a reaction force from the casing G. As a result, the clutch device 60 may regulate the rotation of the first carrier 23. Further, in the clutch device 60, the cam 63 does not mesh with the inner race 61 and the outer race 62 when the rotational force in the second direction acts on the inner race 61. Accordingly, no rotational force is transmitted between the inner race 61 and the outer race 62, and the first carrier 23 does not receive a reaction force from the casing G. For this reason, the clutch device 60 does not regulate the rotation of the first carrier 23. In this way, the clutch device 60 serves as a one-way clutch device.

In the case of the embodiment, the clutch device 60 becomes an engagement state when the inner race 61 rotates in a direction in which the first carrier 23 illustrated in FIG. 1 rotates (turns) in a case where the first motor 11 outputs a rotational force so as to advance the electric vehicle in the first speed change state, that is, the state where the first motor 11 and the second motor 12 are operated. That is, the first direction is a direction in which the inner race 61 serving as the second member rotates when the first motor 11 outputs a rotational force so as to advance the electric vehicle and the second motor 12 is not operated (driven). In this state, in a case where the second motor 12 rotates in a direction opposite to the rotation direction of the first motor 11 and outputs a rotational force in a direction opposite to the rotational force of the first motor 11, the speed change mechanism 13 becomes the first speed change state. In this way, the clutch device 60 is disposed in an engagement direction in a case where the first motor 11 rotates in a direction in which the electric vehicle advances and the second motor 12 is not driven.

Further, in a state where the first motor 11 outputs a rotational force so as to advance the electric vehicle, when the second motor 12 is operated, rotates in the same direction as the rotation direction of the first motor 11, and outputs a rotational force in the same direction as that of the rotational force of the first motor 11, the rotation direction of the second carrier 33 is reversed. As a result, the clutch device 60 becomes a non-engagement state in a case of the second speed change state, that is, a state where the first motor 11 and the second motor 12 are operated so as to output a rotational force in the same direction and the first motor 11 and the second motor 12 output a rotational force so as to advance the electric vehicle. In this way, the clutch device 60 may manually switch the engagement state and the non-engagement state by the direction of the rotational force of the first motor 11 and the direction of the rotational force of the second motor 12.

The clutch device 60 may be a roller clutch device. However, the capacity of the rotational force (the torque) of the cam clutch device is larger than that of the roller clutch device. That is, the magnitude of the force transmitted between the inner race 61 and the outer race 62 of the cam clutch device is larger than that of the roller clutch device. For this reason, the clutch device 60 may transmit the larger rotational force in the case of the cam clutch device. Further, in the clutch device 60, the cam clutch device may further reduce the idle rotation friction which is generated when the cam 63 is separated from the inner race 61 and the outer race 62 compared to the roller clutch device. For this reason, the efficiency may be improved by reducing the friction loss of the entire electric vehicle driving device 10. The first speed change state and the second speed change state are switched in a manner such that the control device 1 controls the rotational forces and the rotation directions of the first motor 11 and the second motor 12.

In the embodiment, the electric vehicle driving device 10 realizes the first speed change state by reversing the directions of the rotational forces between the first motor 11 and the second motor 12. However, the electric vehicle driving device 10 may realize the first speed change state just by operating the first motor 11 without operating the second motor 12. In this case, the control device 1 realizes the first speed change state just by operating the first motor 11 while stopping the second motor 12.

The clutch device 60 may be a sprag type one-way clutch device. In the sprag type one-way clutch, a sprag is used as a friction engagement member, and hence a plurality of sprags may be arranged as many as the number larger than the number of the cams each having a substantially circular bottom surface in the clutch device 60. As a result, the torque capacity of the clutch device 60 may be made to be larger than the torque capacity of the cam clutch device having the same attachment dimension as that of the clutch device 60. Since the torque capacity of the clutch device 60 may be increased, the maximum value of the first distributed rotational force T6 output to the vehicle wheel H may be increased.

Further, the clutch device 60 may not be the one-way clutch device, but a clutch device of a type in which two rotation members engage with each other by moving a piston inside a cylinder using a hydraulic fluid or two rotation members engage with each other by an electromagnetic actuator. However, such a clutch device may need a mechanism for moving a piston or may need electric power for operating an electromagnetic actuator. However, if the clutch device 60 is the one-way clutch device, a mechanism for moving the piston is not needed, and electric power for operating the electromagnetic actuator is not needed. When the clutch device 60 is the one-way clutch device, the engagement state and the non-engagement state may be switched by changing the direction of the rotational force acting on the inner race 61 or the outer race 62 (in the embodiment, the inner race 61). Accordingly, in the clutch device 60, the one-way clutch device may further decrease the number of components, and hence itself (the clutch device 60) may be decreased in size. Next, an example of the structure of the electric vehicle driving device 10 will be described.

Figure 6:
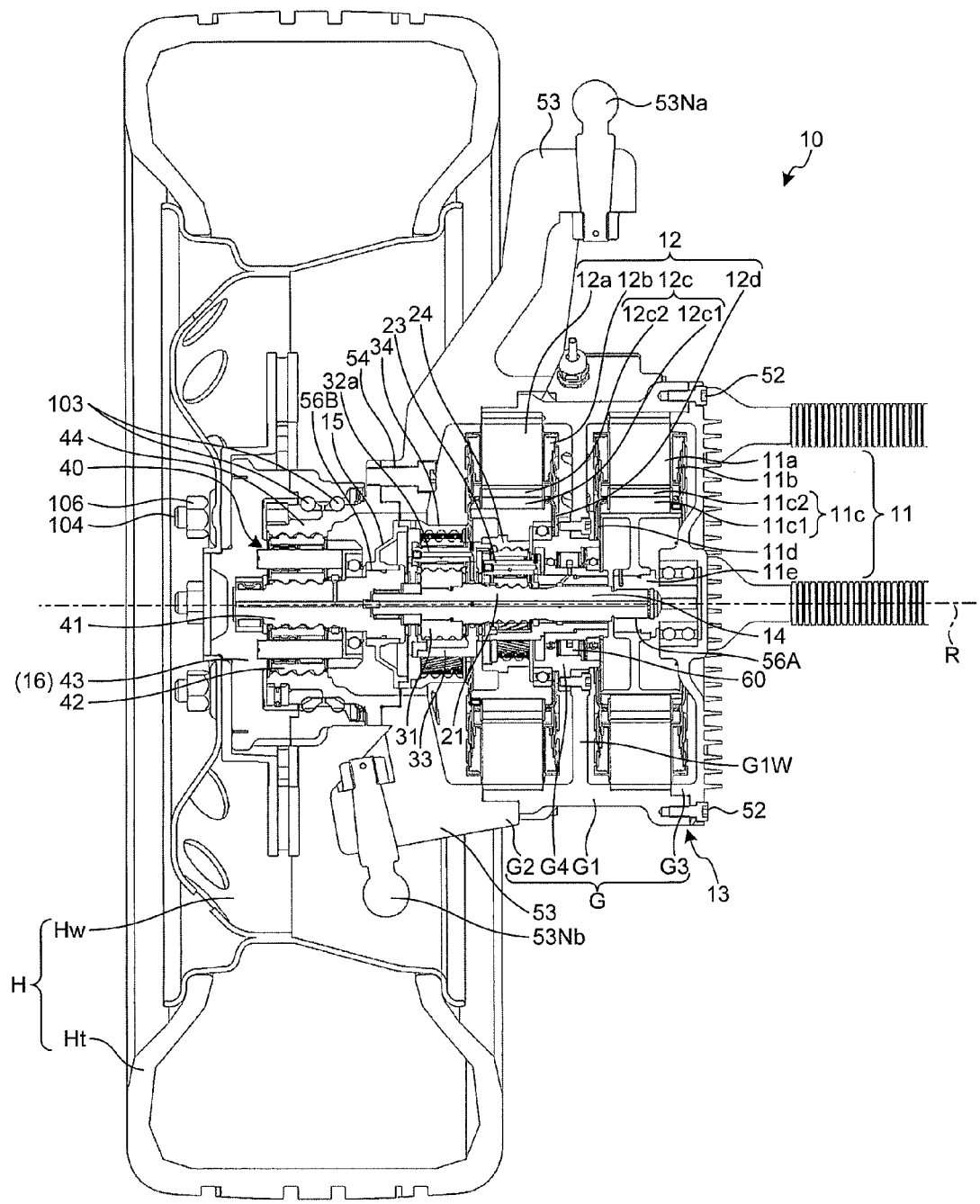
FIG. 6 is a diagram illustrating an internal structure of the electric vehicle driving device according to the embodiment.

FIG. 6 is a diagram illustrating the internal structure of the electric vehicle driving device according to the embodiment. In the description below, the description of the above-described components will not be repeated, and the embodiments are indicated by the same reference numerals in the drawings. As illustrated in FIG. 6, the casing G includes a first casing G1, a second casing G2, a third casing G3, and a fourth casing G4. The first casing G1, the second casing G2, and the fourth casing G4 are cylindrical members. The second casing G2 is installed on the side of the vehicle wheel H in relation to the first casing G1. The first casing G1 and the second casing G2 are fastened to each other by, for example, a plurality of bolts.

The third casing G3 is installed in the opening end opposite to the second casing G2, that is, the opening end on the vehicle body side of the electric vehicle of the first casing G1 among two opening ends of the first casing G1. The first casing G1 and the third casing G3 are fastened to each other by, for example, a plurality of bolts 52. With such a configuration, the third casing G3 blocks the opening of the first casing G1. The fourth casing G4 is installed inside the first casing G1. The first casing G1 and the fourth casing G4 are fastened to each other by, for example, a plurality of bolts.

As illustrated in FIG. 6, the first motor 11 includes a first stator core 11a, a first coil 11b, a first rotor 11c, a first magnetic pattern ring 11d, and a first motor output shaft 11e. The first stator core 11a is a cylindrical member. As illustrated in FIG. 6, the first stator core 11a is fitted into the first casing G1, and is positioned (fixed) by being interposed between the first casing G1 and the third casing G3. The first coil 11b is installed in a plurality of positions of the first stator core 11a. The first coil 11b may be wound on the first stator core 11a with an insulator interposed therebetween.

The first rotor 11c is disposed at the inside of the first stator core 11a in the radial direction. The first rotor 11c includes a first rotor core 11c1 and a first magnet 11c2. The first rotor core 11c1 is a cylindrical member. The plurality of first magnets 11c2 is provided in the inside or the outer peripheral portion of the first rotor core 11c1. The first motor output shaft 11e is a bar-like member. The first motor output shaft 11e is connected to the first rotor core 11c1. The first magnetic pattern ring 11d is installed in the first rotor core 11c1, and rotates about the same shaft as that of the first rotor core 11c1. The first magnetic pattern ring 11d is used to detect the rotation angle of the first rotor core 11c1.

The second motor 12 includes a second stator core 12a, a second coil 12b, a second rotor 12c, and a second magnetic pattern ring 12d. The second stator core 12a is a cylindrical member. The second stator core 12a is positioned (fixed) by being interposed between the first casing G1 and the second casing G2. The second coil 12b is installed in a plurality of positions of the second stator core 12a. The second coil 12b may be wound on the second stator core 12a with an insulator interposed therebetween.

The second rotor 12c is installed at the inside of the second stator core 12a in the radial direction. The second rotor 12c is supported by the fourth casing G4 so as to rotate about the rotation shaft R along with the clutch device 60. The second rotor 12c includes a second rotor core 12c1 and a second magnet 12c2. The second rotor core 12c1 is a cylindrical member. The plurality of second magnets 12c2 is installed in the inside or the outer peripheral portion of the second rotor core 12c1. The second magnetic pattern ring 12d is installed in the second rotor core 12c1, and rotates about the same shaft as that of the second rotor core 12c1. The second magnetic pattern ring 12d is used to detect the rotation angle of the second rotor core 12c1.

As illustrated in FIG. 6, the speed reduction mechanism 40 is fastened and attached to the second casing G2 by, for example, a plurality of bolts 54. In the embodiment, the third ring gear 44 provided in the speed reduction mechanism 40 is attached to the second casing G2. The outer race member (to be described later) of the wheel bearing 50 is attached to one end portion of the third carrier 43 of the speed reduction mechanism 40. A rolling element of the wheel bearing 50 is interposed between the outer race member and the third ring gear 44. The electric vehicle driving device 10 of the embodiment has a structure in which the speed reduction mechanism 40 and the wheel bearing 50 are integrated with each other, and a part of the member becomes both members of the speed reduction mechanism 40 and the wheel bearing 50. The wheel bearing 50 rotatably supports the third carrier 43 on the outer peripheral portion of the third ring gear 44 by a structure in which the third carrier 43 and the third ring gear 44 are held by interposing the rolling element therebetween. The wheel bearing 50 will be described later.

The wheel Hw of the vehicle wheel H is attached to the third carrier 43. The wheel Hw is fastened to the surface of the third carrier 43 perpendicular to the rotation shaft by a stud bolt 104 and a nut 106. A tire Ht is attached to the wheel Hw. The vehicle wheel H of the electric vehicle includes the wheel Hw and the tire Ht. In this example, the vehicle wheel H is directly attached to the third carrier 43. For this reason, the third carrier 43 serves as the speed reduction mechanism input-and-output shaft 16 illustrated in FIG. 1.

Suspension attachment portions 53 are installed in the second casing G2. Specifically, the suspension attachment portions 53 are installed at the upper and lower sides of the second casing G2 in the vertical direction when the electric vehicle driving device 10 is attached to the vehicle body of the electric vehicle. The upper suspension attachment portion 53 in the vertical direction includes an upper joint 53Na, and the lower suspension attachment portion 53 in the vertical direction includes a lower joint 53Nb. The arms of the suspension are attached to the upper joint 53Na and the lower joint 53Nb, and the electric vehicle driving device 10 is supported to the vehicle body of the electric vehicle.

The first motor output shaft 11e and the sun gear shaft 14 are connected to each other by the first fitting portion 56A. With such a structure, power is transmitted between the first motor 11 and the sun gear shaft 14. The first fitting portion 56A includes, for example, a spline which is formed on the inner peripheral surface of the first motor output shaft 11e and a spline which is formed in the end portion of the sun gear shaft 14 on the side of the first motor 11 and is fitted to the above-described spline. With such a structure, the thermal expansion or the like of the first motor output shaft 11e and the sun gear shaft 14 in the direction of the rotation shaft R is absorbed.

The speed change mechanism input-and-output shaft 15 connects the second ring gear 34 provided in the speed change mechanism 13 to the shaft (the third sun gear shaft) of the third sun gear 41 provided in the speed reduction mechanism 40. With such a structure, power is transmitted between the second planetary gear mechanism 30 of the speed change mechanism 13 and the third sun gear shaft of the speed reduction mechanism 40. The speed change mechanism input-and-output shaft 15 and the third sun gear shaft are connected to each other by the second fitting portion 56B. The second fitting portion 56B includes, for example, a spline which is formed on the inner peripheral surface of the speed change mechanism input-and-output shaft 15 and a spline which is formed in the end portion of the third sun gear shaft on the side of the second motor 12 and is fitted to the above-described spline. With such a structure, the thermal expansion or the like of the speed change mechanism input-and-output shaft 15 and the third sun gear shaft in the direction of the rotation shaft R is absorbed.

With the above-described structure, the electric vehicle driving device 10 may allow the electric vehicle to run by holding the vehicle wheel H and transmitting the rotational force output from the first motor 11 and the second motor 12 to the vehicle wheel H. Furthermore, in the embodiment, the first motor 11, the second motor 12, the first sun gear 21, the first carrier 23, the first ring gear 24, the second sun gear 31, the second carrier 33, the second ring gear 34, the third sun gear 41, the third carrier 43, and the third ring gear 44 are all arranged on the same shaft, but in the electric vehicle driving device 10, these components may not be necessarily arranged on the same shaft. Next, the wheel bearing (the hub bearing) 50 will be described.

Figure 7:
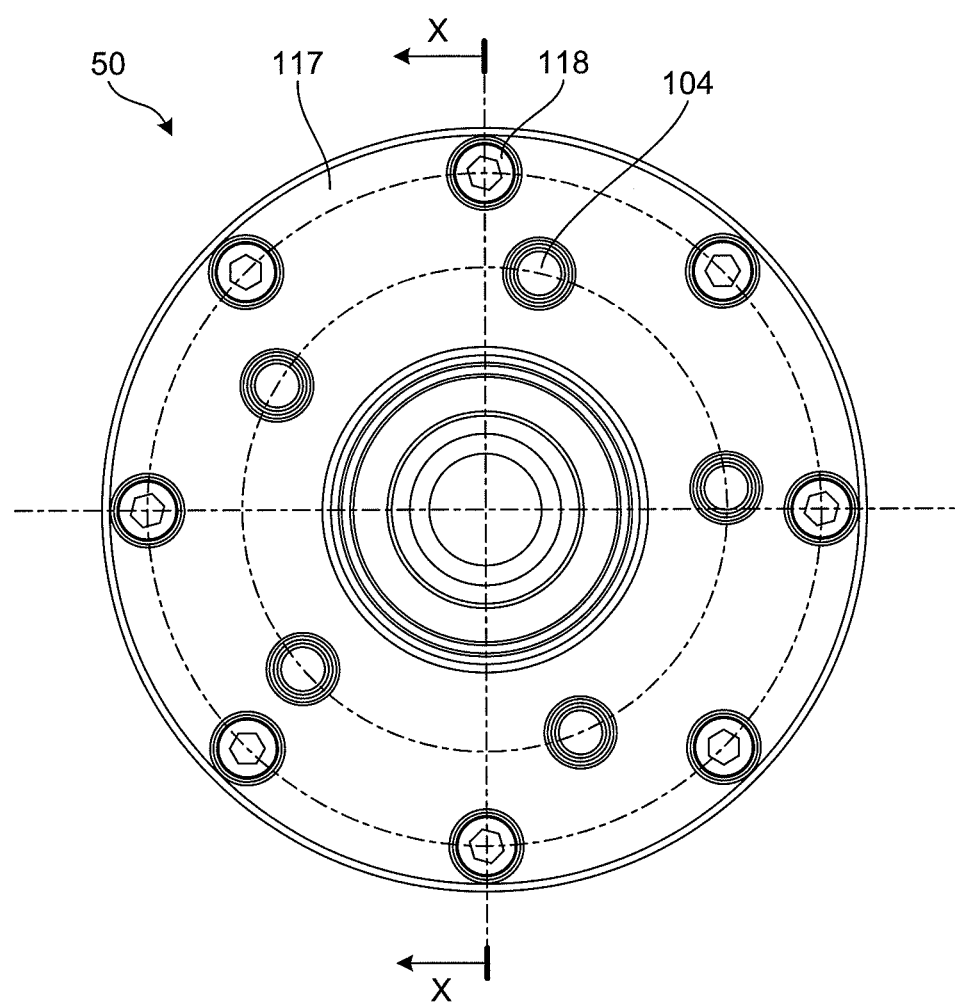
FIG. 7 is a diagram schematically illustrating an appearance of a wheel bearing of the embodiment.
Figure 8:
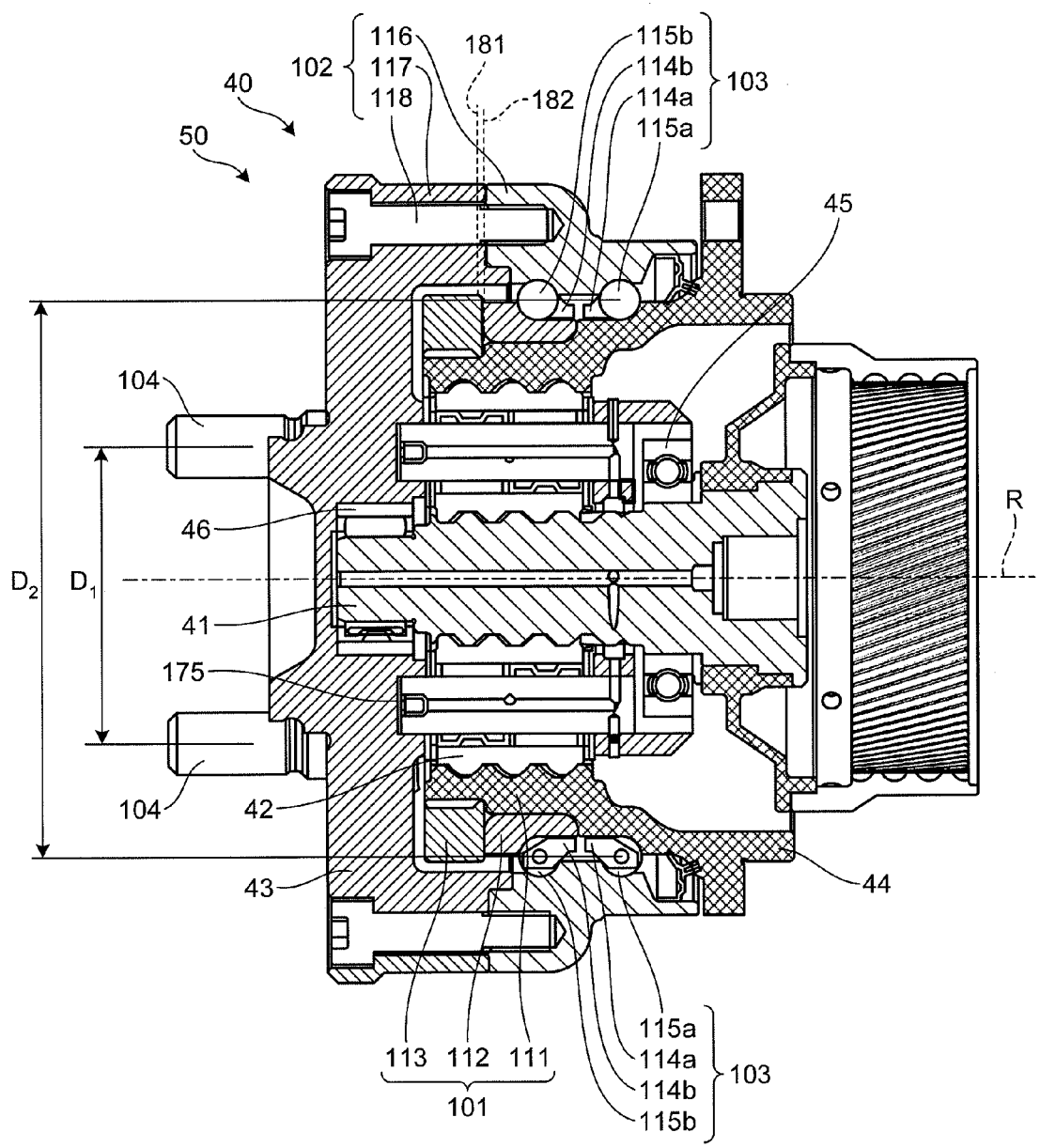
FIG. 8 is a cross-sectional view of X-X of FIG. 7.
Figure 9:
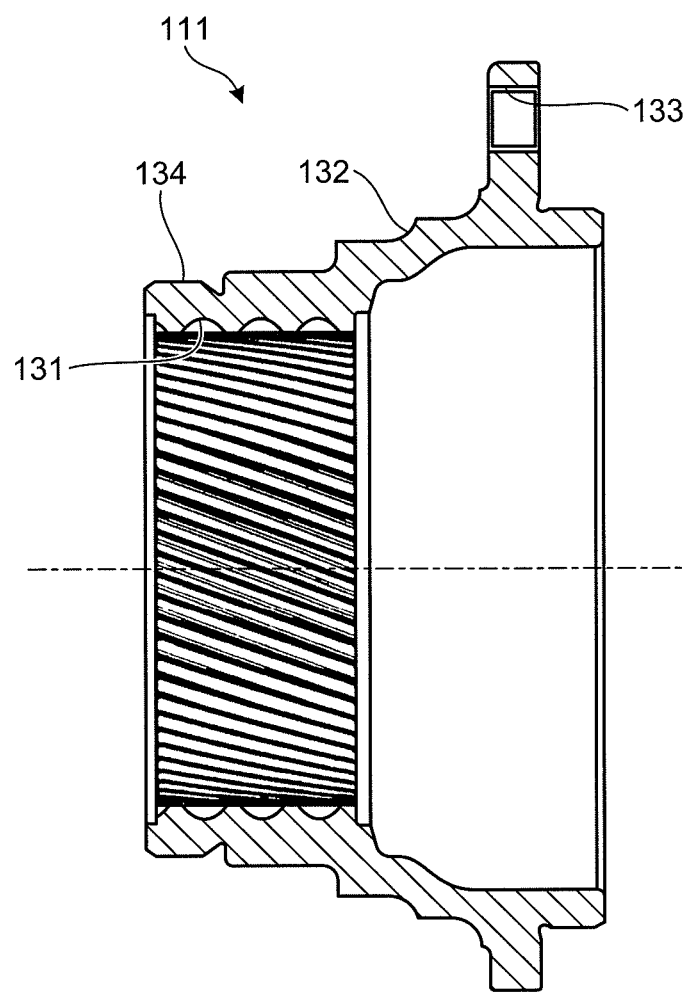
FIG. 9 is a cross-sectional view schematically illustrating a schematic structure of a first inner race member.
Figure 10:
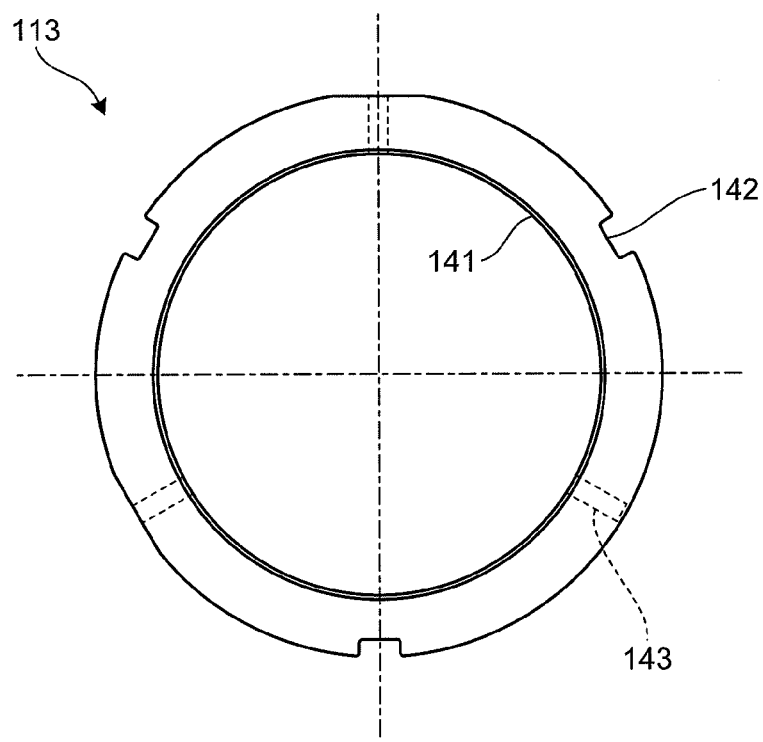
FIG. 10 is a diagram schematically illustrating an appearance of a schematic structure of a locking nut.
Figure 11:
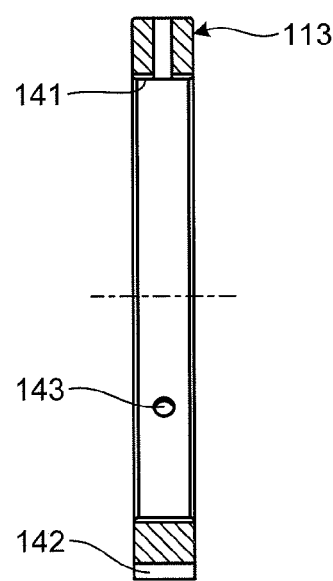
FIG. 11 is a cross-sectional view schematically illustrating the schematic structure of the locking nut.
Figure 12:
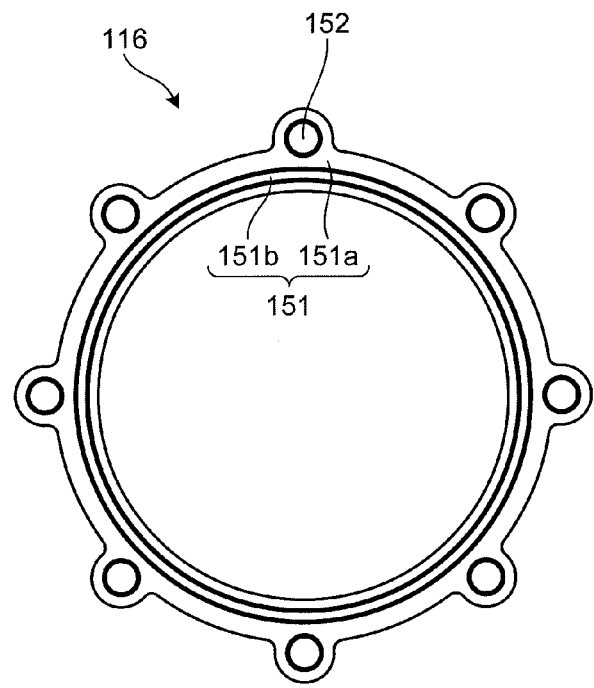
FIG. 12 is a diagram schematically illustrating an appearance of a schematic structure of an outer race member.
Figure 13:
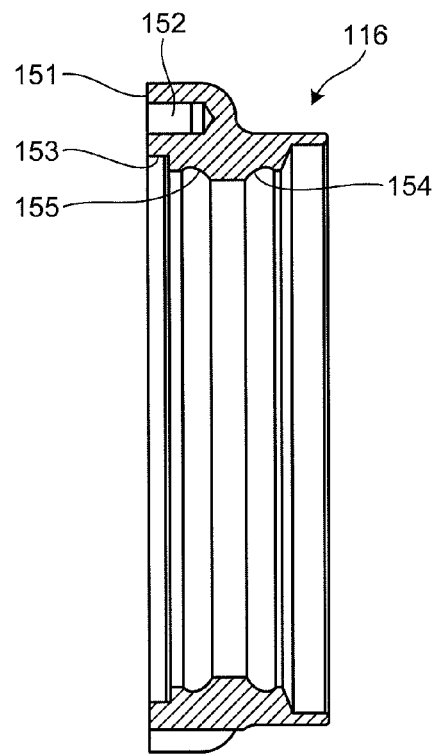
FIG. 13 is a cross-sectional view schematically illustrating a schematic structure of the outer race member.
Figure 14:
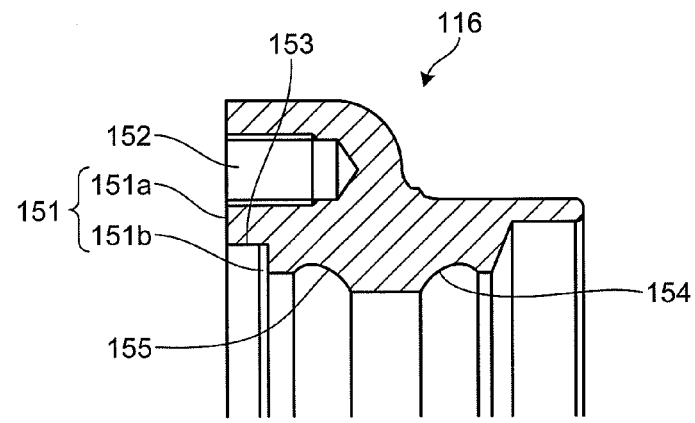
FIG. 14 is an enlarged cross-sectional view illustrating the outer race member.
Figure 15:
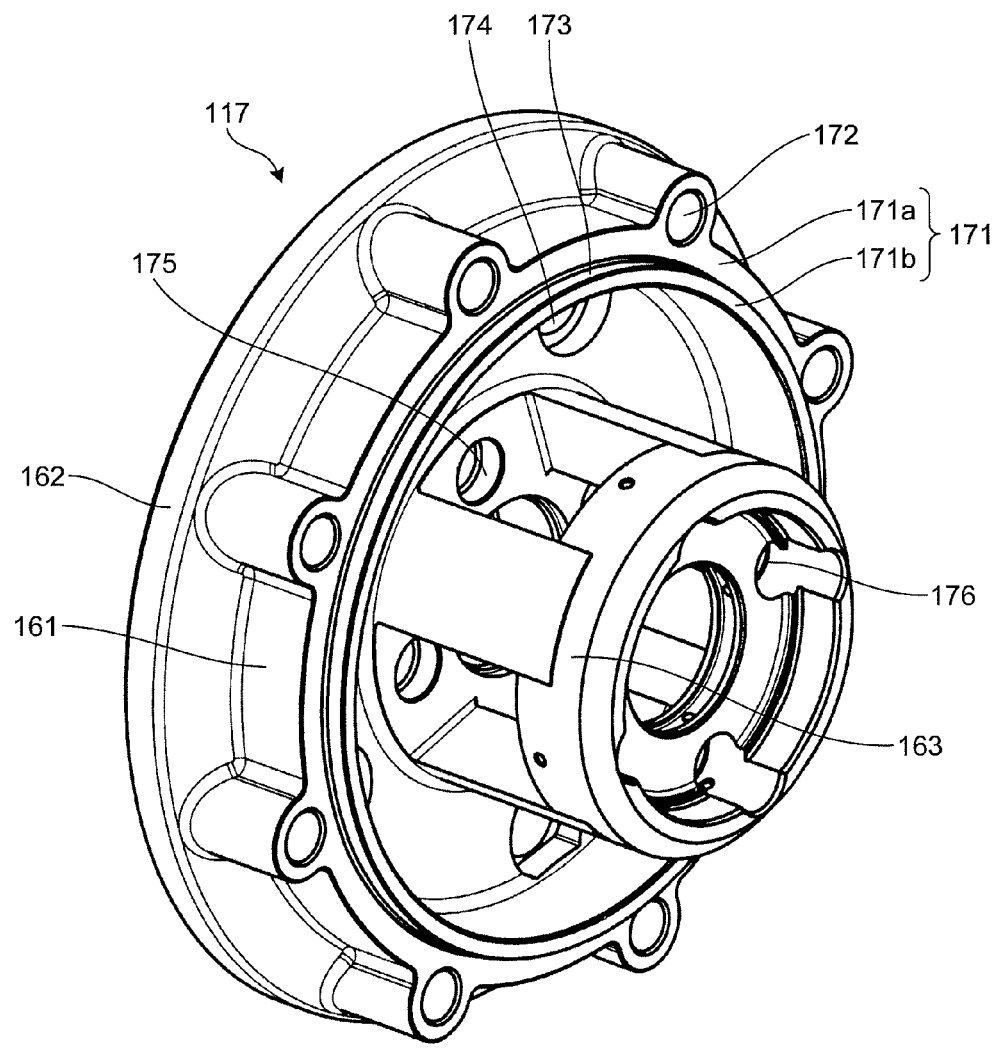
FIG. 15 is a perspective view schematically illustrating an appearance of a schematic structure of a wheel flange.
Figure 16:
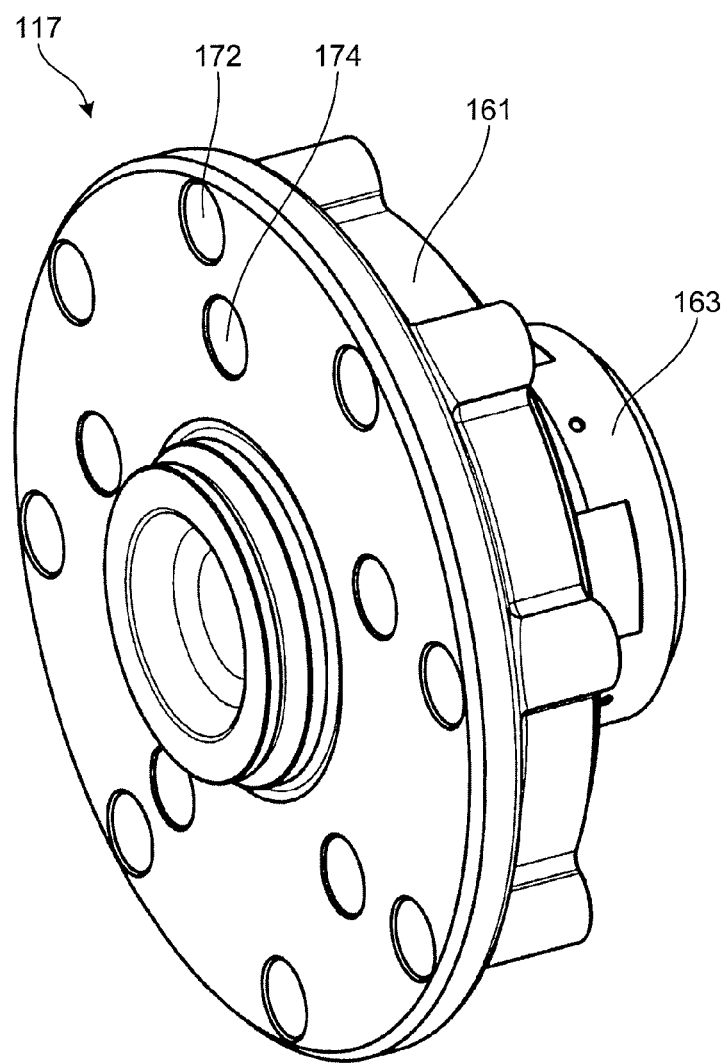
FIG. 16 is a perspective view schematically illustrating the appearance of the schematic structure of the wheel flange at an angle different from that of FIG. 15.
Figure 17:
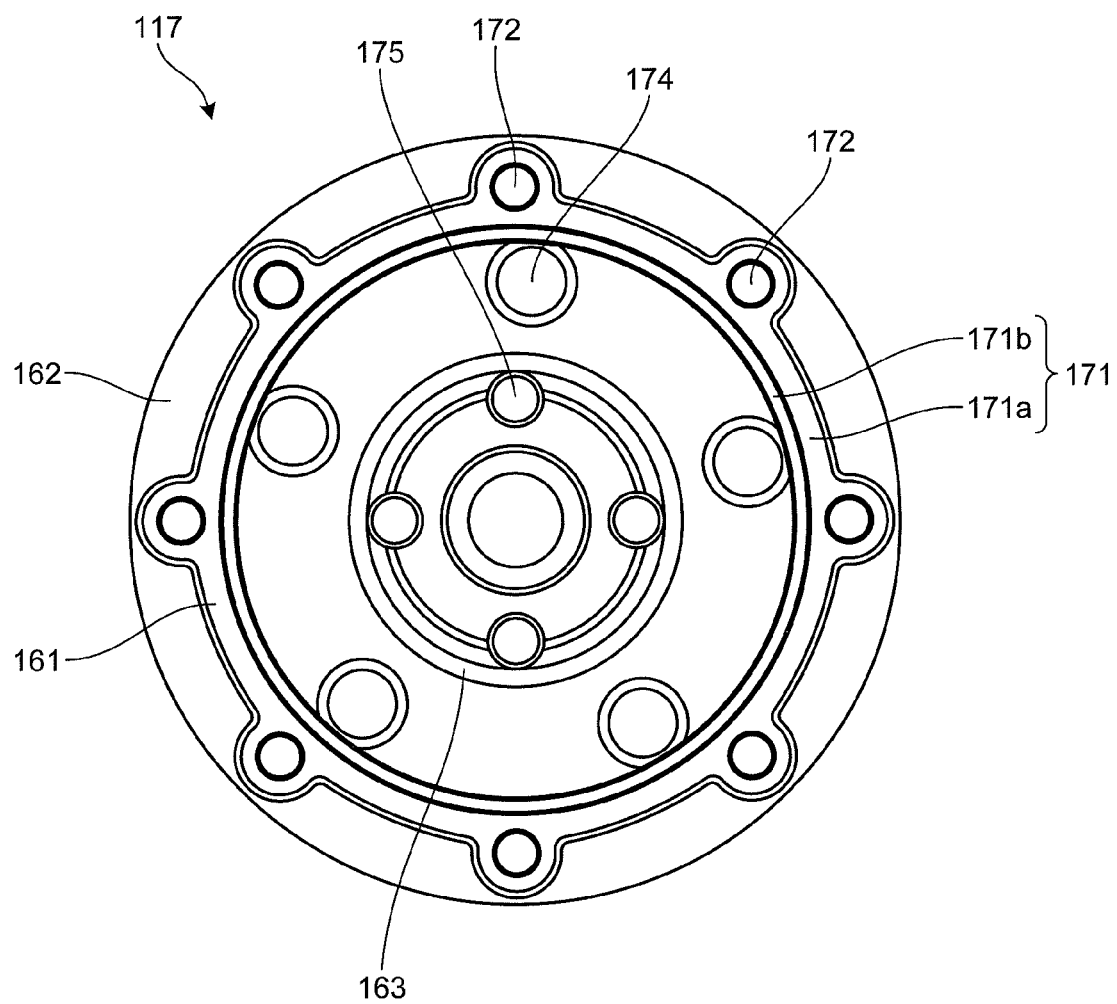
FIG. 17 is a diagram schematically illustrating an appearance of the schematic structure of the wheel flange.
Figure 18:
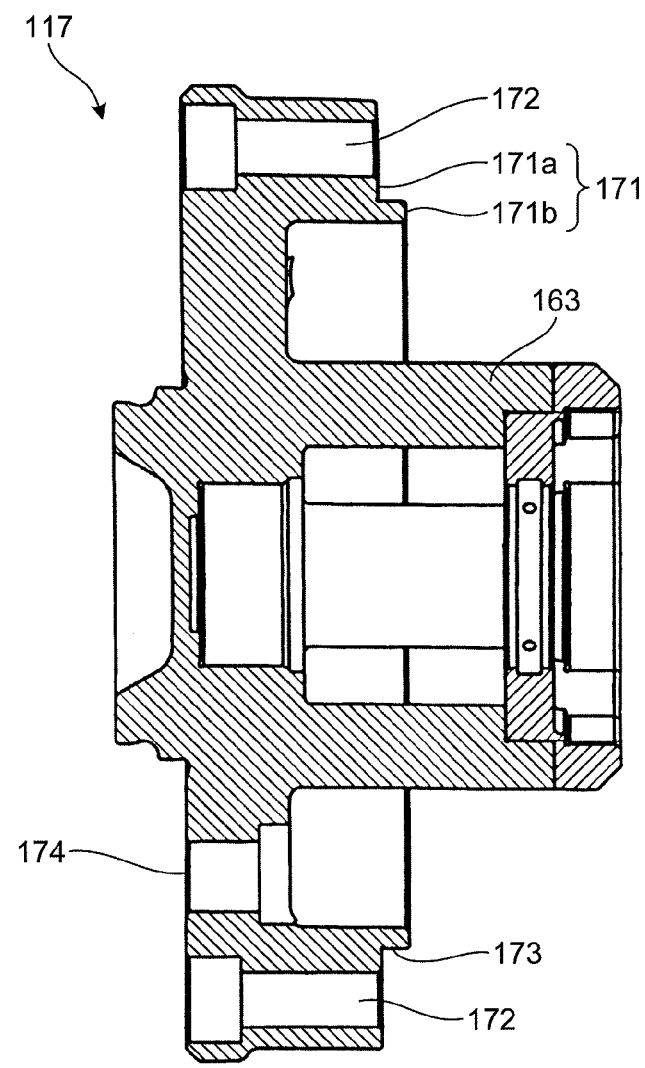
FIG. 18 is a cross-sectional view schematically illustrating the schematic structure of the wheel flange.

FIG. 7 is a diagram schematically illustrating an appearance of the wheel bearing of the embodiment. FIG. 8 is a cross-sectional view of X-X of FIG. 7. FIG. 9 is a cross-sectional view schematically illustrating a schematic structure of the first inner race member. FIG. 10 is a diagram schematically illustrating an appearance of a schematic structure of a locking nut. FIG. 11 is a cross-sectional view schematically illustrating the schematic structure of the locking nut. FIG. 12 is a diagram schematically illustrating an appearance of a schematic structure of an outer race member. FIG. 13 is a cross-sectional view schematically illustrating the schematic structure of the outer race member. FIG. 14 is an enlarged cross-sectional view illustrating the outer race member. FIG. 15 is a perspective view schematically illustrating an appearance of a schematic structure of a wheel flange. FIG. 16 is a perspective view schematically illustrating an appearance of the schematic structure of the wheel flange in a direction different from that of FIG. 15. FIG. 17 is a diagram schematically illustrating an appearance of the schematic structure of the wheel flange. FIG. 18 is a cross-sectional view schematically illustrating the schematic structure of the wheel flange.

As illustrated in FIGS. 7 and 8, the wheel bearing 50 is integrally formed with the speed reduction mechanism 40. Furthermore, as described above, the speed reduction mechanism 40 includes the third sun gear 41, the fourth pinion gear 42, the third carrier 43, and the third ring gear 44. Further, as illustrated in FIG. 8, in the speed reduction mechanism 40, a bearing 45 is disposed in one end portion of the third sun gear 41 in the axial direction, and a bearing 46 is disposed in the other end portion. The bearing 45 and the bearing 46 support the third sun gear 41 and the third carrier 43 in a relatively rotatable state.

As illustrated in FIGS. 7 and 8, the wheel bearing 50 includes an inner race portion 101 which is fastened to the second casing G2, an outer race portion 102 which is attached to the wheel Hw, a rolling element 103 which connects the inner race portion 101 and the outer race portion 102 so as to be relatively rotatable about the rotation shaft R (in a state where the inner race portion 101 is fixed and the outer race portion 102 rotates), and the stud bolt 104 and the nut 106 (see FIG. 6) which connect the outer race portion 102 to the wheel Hw. Here, a part of the inner race portion 101 becomes the third ring gear 44. Further, a part of the outer race portion 102 becomes the third carrier 43. The stud bolt 104 and the nut 106 may not be included in the wheel bearing 50.

The inner race portion 101 includes a first inner race member 111, a second inner race member 112, and a locking nut 113. The first inner race member 111 is also the third ring gear 44, and is fixed to the second casing G2. As illustrated in FIGS. 8 and 9, the first inner race member 111 is a cylindrical member, where the inner peripheral surface is provided with a tooth groove 131, and the outer peripheral surface thereof is provided with a concave surface 132, a bolt hole 133, and a male screw 134. Furthermore, as for the concave surface 132, the bolt hole 133, and the male screw 134, the male screw 134, the concave surface 132, and the bolt hole 133 formed in this order from the side of the stud bolt 104. The tooth groove 131 is a groove which is formed by the tooth engaging with the fourth pinion gear 42. The first inner race member 111 engages with the fourth pinion gear 42 by the tooth groove 131, and serves as the third ring gear 44. The concave surface 132 is a region which comes into contact with the rolling element 103, and is a curved surface which is recessed toward the inner radial side. The concave surface 132 extends in the circumferential direction of the rotation shaft R. The concave surface 132 has a shape in which the end portion near the bolt hole 133 in the direction parallel to the rotation shaft R further protrudes outward in the radial direction and the end portion near the male screw 134 is smoothly connected to the line parallel to the rotation shaft R (that is, the end portion does not protrude). The bolt hole 133 is formed in a portion which protrudes outward in the radial direction from the cylindrical shape of the first inner race member 111. A bolt which engages with the second casing G2 is inserted into the bolt hole 133. Accordingly, the first inner race member 111 is fixed to the second casing G2. The male screw 134 is a screw groove, and is formed in a predetermined region from the end portion of the first inner race member 111 on the side of the stud bolt 104. Further, in the first inner race member 111, a step is formed which increases in diameter in the course from the male screw 134 to the concave surface 132 between the concave surface 132 and the male screw 134.

The second inner race member 112 is an annular member, and the inner peripheral surface thereof comes into contact with the portion between the concave surface 132 of the first inner race member 111 and the male screw 134. In the second inner race member 112, the end surface of the first inner race member 111 on the side of the concave surface 132 comes into contact with the step of the first inner race member 111. Further, in the second inner race member 112, the outer peripheral surface thereof is provided with a concave surface as a region which comes into contact with the rolling element 103. The concave surface of the second inner race member 112 extends in the circumferential direction of the rotation shaft R, and is a curved surface which is recessed toward the inner radial side. The concave surface has a shape in which the end portion near the male screw 134 in a direction parallel to the rotation shaft R further protrudes outward in the radial direction and the end portion near the bolt hole 133 is smoothly connected to the line parallel to the rotation shaft R (that is, the end portion does not protrude).

As illustrated in FIGS. 8, 10, and 11, the locking nut 113 is an annular member, where the inner peripheral surface is provided with a female screw 141 and a part of the outer peripheral surface is provided with a concave surface 142. Further, in the locking nut 113, three holes 143 are provided at the same interval in the circumferential direction. In the locking nut 113, the female screw 141 is threaded into the male screw 134 of the first inner race member 111. Further, in the locking nut 113, a pin or the like is inserted into the hole 143, and hence the locking nut 113 is fixed to the first inner race member 111 so as not to be rotatable. Accordingly, the locking nut 113 is fixed to the first inner race member 111. Further, the locking nut 113 may rotate the locking nut 113 by rotating a tool in a state where the tool is inserted into the concave surface 142 formed in the outer peripheral surface. Accordingly, the locking nut 113 may be simply rotated during the assembly. In the locking nut 113, the diameter of the outer peripheral surface is larger than the diameter of the outer peripheral surface between the concave surface 132 of the first inner race member 111 and the male screw 134. Accordingly, the end surface of the locking nut 113 on the side of the concave surface 132 comes into contact with the second inner race member 112. As described above, in the inner race portion 101, when the locking nut 113 is fixed to the first inner race member 111, the second inner race member 112 may be interposed between the first inner race member 111 and the locking nut 113, and hence the position of the second inner race member 112 in the radial direction may be also fixed.

The outer race portion 102 includes an outer race member 116, a wheel flange 117, and a fixation bolt 118. As illustrated in FIG. 8 and FIGS. 12 to 14, the outer race member 116 is an annular member, and the end surface near the stud bolt 104 becomes a contact surface 151 which faces the wheel flange 117 and comes into contact with the wheel flange 117. In the outer race member 116, a plurality of (eight in the embodiment) bolt holes 152 is formed in the contact surface 151 at the same interval in the circumferential direction. Further, in the outer race member 116, the portion which surrounds the outer periphery of the bolt hole 152 protrudes outward in the radial direction in relation to the other portion. The bolt hole 152 is a hole which extends in a direction parallel to the rotation shaft R and of which the inner peripheral surface is provided with a thread groove. The bolt hole extends from the contact surface 151 to the middle of the outer race member 116 (by a depth in which the hole does not penetrate). The contact surface 151 of the outer race member 116 has a shape in which the positions in the direction of the rotation shaft R at the inside of the radial direction and the outside of the radial direction are different from each other. That is, in the outer race member 116, a step 153 is formed in a predetermined position of the contact surface 151 in the radial direction. In the contact surface 151, the outer radial side in relation to the step 153 becomes an outer radial side contact surface 151a, and the inner radial side in relation to the step 153 becomes an inner radial side contact surface 151b. The step 153 has a shape in which the inner radial side contact surface 151b is recessed compared to the outer radial side contact surface 151a. In the step 153, the boundary surface between the outer radial side contact surface 151a and the inner radial side contact surface 151b becomes a surface facing the inside in the radial direction.

In the outer race member 116, the inner peripheral surface thereof is provided with a concave surface 154 and a concave surface 155. In the concave surface 154 and the concave surface 155, the concave surface 155 is formed near the contact surface 151. The concave surface 154 is a region which comes into contact with the rolling element 103, and is a curved surface which is recessed toward the outer radial side. The concave surface 154 extends in the circumferential direction of the rotation shaft R. In the concave surface 154, the end portion near the contact surface 151 in a direction parallel to the rotation shaft R protrudes inward in the radial direction in relation to the opposite end portion. The concave surface 155 is also a region which comes into contact with the rolling element 103, and is a curved surface which is recessed toward the outer radial side. The concave surface 155 extends in the circumferential direction of the rotation shaft R. In the concave surface 155, the end portion opposite to the contact surface 151 in a direction parallel to the rotation shaft R protrudes inward in the radial direction in relation to the end portion near the contact surface 151.

As illustrated in FIGS. 7 and 8 and FIGS. 15 to 18, the wheel flange 117 is a cylindrical member, and includes a body 161, a flange 162, and a cylindrical portion 163. One end surface of the cylindrical body 161 is provided with the flange 162 of which the outer peripheral diameter is larger than that of the body 161. The flange 162 is a disk-like member, and the cylindrical portion 163 which is formed about the rotation shaft R is formed at the inner radial side in relation to the body 161. In the cylindrical portion 163, one end surface of the cylindrical portion is connected to the flange 162, and the other end surface protrudes in a direction moving away from the flange 162 in relation to the end surface of the body 161 without the flange 162.

In the wheel flange 117, the end surface of the body 161 without the flange 162 becomes a contact surface 171 which comes into contact with the contact surface 151 of the outer race member 116. In the body 161, a plurality of (in the embodiment, eight) bolt holes 172 is formed in the contact surface 171 at the same interval in the circumferential direction. Further, in the body 161, the portion which surrounds the outer periphery of the bolt hole 172 protrudes outward in the radial direction in relation to the other portion. The bolt hole 172 is a hole which extends in a direction parallel to the rotation shaft R and penetrates in the direction of the rotation shaft R, and as illustrated in FIGS. 8 and 18, a part of the side away from the contact surface 171 is provided with a step in which the opening diameter of the hole is widened. Further, the contact surface 171 of the body 161 has a shape in which the positions in the direction of the rotation shaft R at the inside of the radial direction and the outside of the radial direction are different from each other. That is, in the wheel flange 117, a step 173 is formed at a predetermined position of the contact surface 171 in the radial direction. In the contact surface 171, the outer radial side in relation to the step 173 becomes an outer radial side contact surface 171a, and the inner radial side in relation to the step 173 becomes an inner radial side contact surface 171b. The step 173 has a shape in which the inner radial side contact surface 171b protrudes further than the outer radial side contact surface 171a. In the step 173, the boundary surface between the outer radial side contact surface 171a and the inner radial side contact surface 171b becomes a surface facing the outside in the radial direction. In this way, the contact surface 171 has a shape corresponding to the contact surface 151. That is, in the contact surface 171, the portion which faces the recessed portion of the contact surface 151 protrudes.

In the flange 162, a plurality of (in the embodiment, five) bolt holes 174 is formed in the portion on the inner radial side of the body 161 at the same interval in the circumferential direction. The bolt hole 174 is a hole into which the stud bolt 104 is inserted. The bolt hole 174 is a hole which extends in a direction parallel to the rotation shaft R and penetrates in a direction of the rotation shaft R, and as illustrated in FIGS. 8 and 18, a part of the side away from the contact surface 171 is provided with a step in which the opening diameter of the hole is narrowed.

In the flange 162, the inner radial side portion in relation to the cylindrical portion 163 is provided with a plurality of (in the embodiment, four) concave portions 175 formed at the same interval in the circumferential direction. The end portion of the shaft of the fourth pinion gear 42 may come into contact with the concave portion 175. Further, in the cylindrical portion 163, a hole 176 is formed in a space facing a position provided with the concave portion 175 in the end portion opposite to the flange 162. The hole 176 is a hole into which the shaft of the fourth pinion gear 42 is inserted. The wheel flange 117 has the above-described configuration. The fourth pinion gear 42 is disposed inside the cylindrical portion 163, and the shaft is inserted into the hole 176 so as to be able to come into contact with the concave portion 175. Accordingly, when the fourth pinion gear 42 rotates (revolves) about the rotation shaft R, the wheel flange 117 also rotates. Accordingly, the wheel flange 117 also becomes the third carrier 43 of the speed reduction mechanism 40.

The fixation bolt 118 is inserted into the bolt hole 172 and the bolt hole 152 from the side of the stud bolt 104 (the wheel Hw) of the wheel flange 117 and is threaded into the screw groove, thereby fastening the outer race member 116 to the wheel flange 117. In the fixation bolt 118, the head portion comes into contact with the step of the bolt hole 172 of the wheel flange 117.

The outer race portion 102 has the above-described configuration, and the outer race member 116 and the wheel flange 117 are fixed by the fixation bolt 118, so that the outer race member 116 and the wheel flange 117 rotate together.

The rolling element 103 includes a unit which includes a retainer 114a and a plurality of steel balls 115a and a unit which includes a retainer 114b and a plurality of steel balls 115b. The retainer 114a and the plurality of steel balls 115a are disposed in a space which is surrounded by the concave surface 132 of the first inner race member 111 and the concave surface 154 of the outer race member 116. The retainer 114a is an annular member, and rotatably supports the plurality of steel balls 115a while maintaining a uniform distance between the adjacent steel balls 115a. The plurality of steel balls 115a comes into contact with the concave surface 132 of the first inner race member 111 and the concave surface 154 of the outer race member 116, and rotates with the movement of the contact surfaces when the first inner race member 111 and the outer race member 116 relatively rotate. The retainer 114b and the plurality of steel balls 115b are disposed in a space which is surrounded by the concave surface of the second inner race member 112 and the concave surface 155 of the outer race member 116. That is, the unit which includes the retainer 114b and the plurality of steel balls 115b is disposed near the stud bolt 104 in relation to the unit which includes the retainer 114a and the plurality of steel balls 115a. The retainer 114b is an annular member, and rotatably supports the plurality of steel balls 115b while maintaining the uniform distance between the adjacent steel balls 115b. The plurality of steel balls 115b comes into contact with the concave surface of the second inner race member 112 and the concave surface 155 of the outer race member 116, and rotates with the movement of the contact surfaces when the second inner race member 112 and the outer race member 116 relatively rotate. The rolling element 103 is disposed between the inner race portion 101 and the outer race portion 102, and when the plurality of steel balls 115a and the plurality of steel balls 115b rotate with the relative rotation therebetween, both members may smoothly rotate relative to each other. Further, when the plurality of steel balls 115a and the plurality of steel balls 115b are arranged so as to be adjacent to each other in the circumferential direction, it is possible to inhibit the inner race portion 101 and the outer race portion 102 from being deviated from the rotation shaft R. Further, the deviation of the rolling element 103 with respect to the rotation shaft R may be inhibited in a manner such that two units, a unit including the retainer 114a and the plurality of steel balls 115a and a unit including the retainer 114b and the plurality of steel balls 115b are provided, that is, the inner race portion 101 and the outer race portion 102 are supported at two positions in a direction parallel to the rotation shaft R.

The stud bolt 104 is inserted into the bolt hole 174 of the wheel flange 117 as described above. Here, the stud bolt 104 is inserted into the bolt hole 174 in a direction in which the head portion is disposed near the cylindrical portion 163 of the wheel flange 117, that is, the shaft portion (the portion provided with the screw groove) protrudes toward the wheel Hw. Further, as described above, the nut 106 is threaded into the stud bolt 104, so that the wheel flange 117 and the wheel Hw are fastened to each other. The wheel bearing (the hub bearing) 50 has the above-described configuration.

The wheel bearing 50 has a configuration in which the outer race portion 102 is divided into the outer race member 116 which comes into contact with the rolling element 103 and the wheel flange 117 which is connected to the wheel Hw, and when the outer race member 116 and the wheel flange 117 are fixed to each other by the fixation bolt 118, the outer race portion 102 may be assembled by the fastening of the fixation bolt 118. Further, when the wheel flange 117 has a shape in which the end surface away from the outer race member 116 in a direction parallel to the rotation shaft R extends to the rotation shaft R in relation to the inner race portion 101 in the radial direction of the rotation shaft R, the wheel flange 117 and the wheel Hw may be appropriately connected to each other. Specifically, after the outer race member 116 and the inner race portion 101 are connected to each other through the rolling element 103, the outer race member 116 and the wheel flange 117 may be connected to each other. Accordingly, the bearing portion (the respective members coming into contact with the rolling element 103) of the wheel bearing 50 may be easily assembled. Further, since the wheel bearing 50 has a structure in which the outer race member 116 and the wheel flange 117 are divided from each other, the outer race member 116 and the wheel flange 117 may be made of different materials. For example, the outer race member 116 may be made of carbon steel, and the wheel flange 117 may be made of aluminum alloy. Accordingly, since the balance between the necessary strength and the necessary weight may be appropriately adjusted by the position of the outer race portion 102, the wheel bearing 50 may be decreased in weight.

Further, as illustrated in FIG. 8, when the wheel bearing 50 has a configuration in which a pitch circle diameter (a hub bolt PCD) $D_1$ obtained by connecting, as a circle, the respective centers of the plurality of bolt holes (openings) 174 of the wheel flange 117 having the stud bolt 104 inserted thereinto is smaller than a pitch circle diameter (a ball PCD (Pitch Circle Diameter)) $D_2$ obtained by connecting, as a circle, the centers (the centers of the steel balls 115a and 115b) of the radial direction perpendicular to the rotation shaft R of the rolling element 103, various wheels may be used as the wheel which is connected to the wheel bearing 50. Further, as the wheel, a wheel used in a vehicle driven by a gasoline engine and a wheel used in a hybrid vehicle may be also used. Further, when the wheel flange 117 is made of aluminum alloy, the wheel flange 117 may be decreased in weight, and hence the hub bolt PCD may be further decreased in size.

Further, as the fastening member which connects the wheel Hw and the wheel flange 117 to each other, the stud bolt 104 may be used which extends in a direction parallel to the rotation shaft R and of which the head portion is exposed to the surface of the wheel flange 117 near the inner race portion 101, and when the nut 106 is threaded from the side of the wheel Hw during the attachment of the wheel, the wheel Hw and the wheel bearing 50 may be fastened to each other. Further, when the outer race member 116 and the wheel flange 117 are adapted to be separated from each other as in the embodiment, the stud bolt 104 may be easily replaced. Furthermore, as the fastening member, a fastening member other than the stud bolt 104 may be used. For example, a configuration (a lag bolt type) may be used in which a bolt hole is formed in the wheel flange and a bolt is inserted from the wheel.

Further, in the wheel bearing 50, the fixation bolt 118 of which the shaft portion extends in a direction parallel to the rotation shaft R is used as the fixation mechanism which fixes the outer race member 116 and the wheel flange 117 to each other, and hence both members may be simply fixed to each other.

The wheel bearing 50 has a configuration in which the head portion of the fixation bolt 118 is accommodated in the outer race portion 102, and hence the fixation bolt 118 may be inserted from the outer race portion 102. That is, the fixation bolt 118 may be inserted into the bolt hole from the opened side region before the attachment of the wheel Hw. Accordingly, the outer race member 116 and the wheel flange 117 may be further simply fixed to each other.

Further, the wheel bearing 50 has a spigot structure in which the contact surface 151 of the outer race member 116 and the contact surface 171 of the wheel flange 117 have an uneven shape (the contact surface 171 of the wheel flange 117 is provided with a convex protrusion portion toward the outer race member 116), the axes of the outer race member 116 and the wheel flange 117 may easily match each other during the assembly. Further, it is possible to inhibit the outer race member 116 and the wheel flange 117 from being deviated from the rotation shaft R.

Further, it is desirable that the wheel bearing 50 has a structure in which the wheel flange 117 is made of a material having a liner expansion coefficient larger than that of the outer race member 116 and the step 173 of the contact surface 171 of the wheel flange 117 is formed at the inside in relation to the end portion of the contact surface 151 in a direction perpendicular to the rotation shaft R. That is, it is desirable that the wheel flange 117 is formed of a material having a linear expansion coefficient larger than that of the outer race member 116 and the boundary surface of the step 173 of the contact surface 171 of the wheel flange 117 has an outer radial shape. Accordingly, even when the outer race portion 102 expands due to heat or the like, the protrusion portion of the wheel flange 117 on the inside of the radial direction has a shape of pressing the contact surface 151 of the outer race member 116, and hence a positional deviation or a space in the boundary surface may be inhibited.

Further, as in the embodiment, it is desirable that the wheel bearing 50 has a shape in which the locking nut 113 is exposed to the stud bolt (the wheel) in relation to the contact surface 151 of the outer race member 116. That is, as illustrated in FIG. 8, it is desirable that an end surface 181 which is far from the stud bolt (the wheel) of the locking nut 113 in a direction parallel to the rotation shaft R is near the stud bolt (the wheel) in relation to an end surface 182 near the stud bolt (the wheel) of the contact surface 151 of the outer race member 116. Accordingly, the outer peripheral surface of the locking nut 113 may be exposed when threading the locking nut 113 into the first inner race member 111. Accordingly, the locking nut 113 may be further simply threaded into the first inner race member 111. Furthermore, in the embodiment, a structure is adopted in which the inner race portion is formed by combining the first inner race member and the second inner race member with each other, but the invention is not limited thereto. The inner race portion may be provided with a plurality of second inner race members. Regardless of the number of the inner race members, the inner race member may be fixed to a predetermined position by the locking nut.

Furthermore, in the wheel bearing 50, a unit including the retainer 114a of the rolling element 103 and the plurality of steel balls 115a is inserted into the first inner race member 111, the outer race member 116 is inserted, a unit including the retainer 114b of the rolling element 103 and the plurality of steel balls 115b is inserted, and the second inner race member 112 is inserted, and the locking nut 113 and the first inner race member 111 are fastened to each other. Subsequently, the outer race member 116 and the wheel flange 117 are fixed to each other by the fixation bolt 118. Furthermore, the stud bolt 104 is inserted into the wheel flange 117. Subsequently, when the nut 106 is threaded after the wheel Hw is inserted into the stud bolt 104, the wheel bearing 50 may be assembled, and the wheel Hw may be attached to the wheel bearing 50. In this way, the wheel bearing 50 may be assembled by sequentially inserting the components from the wheel Hw. Accordingly, since the assembly may be simply performed, the separation may be also simply performed.

Further, when the wheel bearing 50 is integrally formed with the speed reduction mechanism 40, and specifically, the wheel flange 117 is integrally formed with the third carrier 43 and the inner race portion 101 is integrally formed with the third ring gear 44, a decrease in size and weight may be realized. Next, a structure which detects the angular velocities (the rotation speeds) of the first motor 11 and the second motor 12 will be described.

The first magnetic pattern ring 11d and the second magnetic pattern ring 12d are arranged so as to face each other while being away from a partition wall G1W of the casing G1 interposed between the first motor 11 and the second motor 12. That is, the first magnetic pattern ring 11d and the second magnetic pattern ring 12d respectively face the partition wall G1W.

Figures 1, 19:
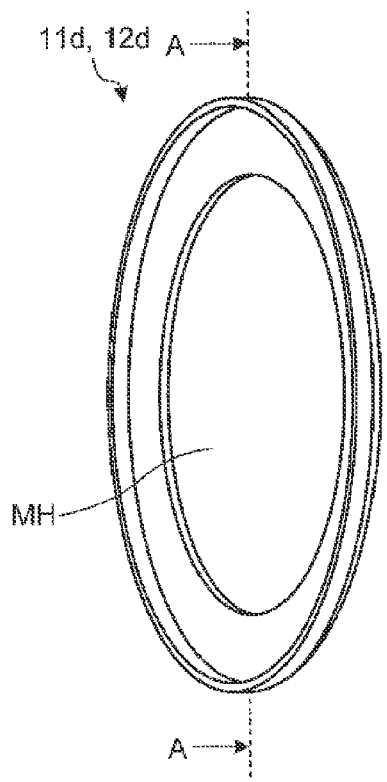
Figures 2, 19:
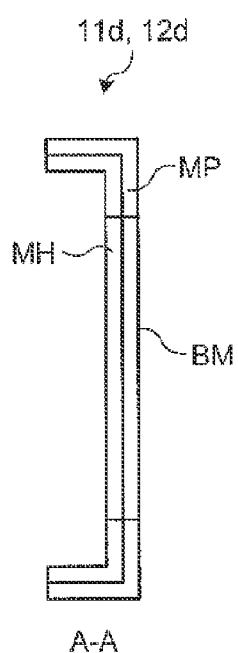
Figures 3, 19:
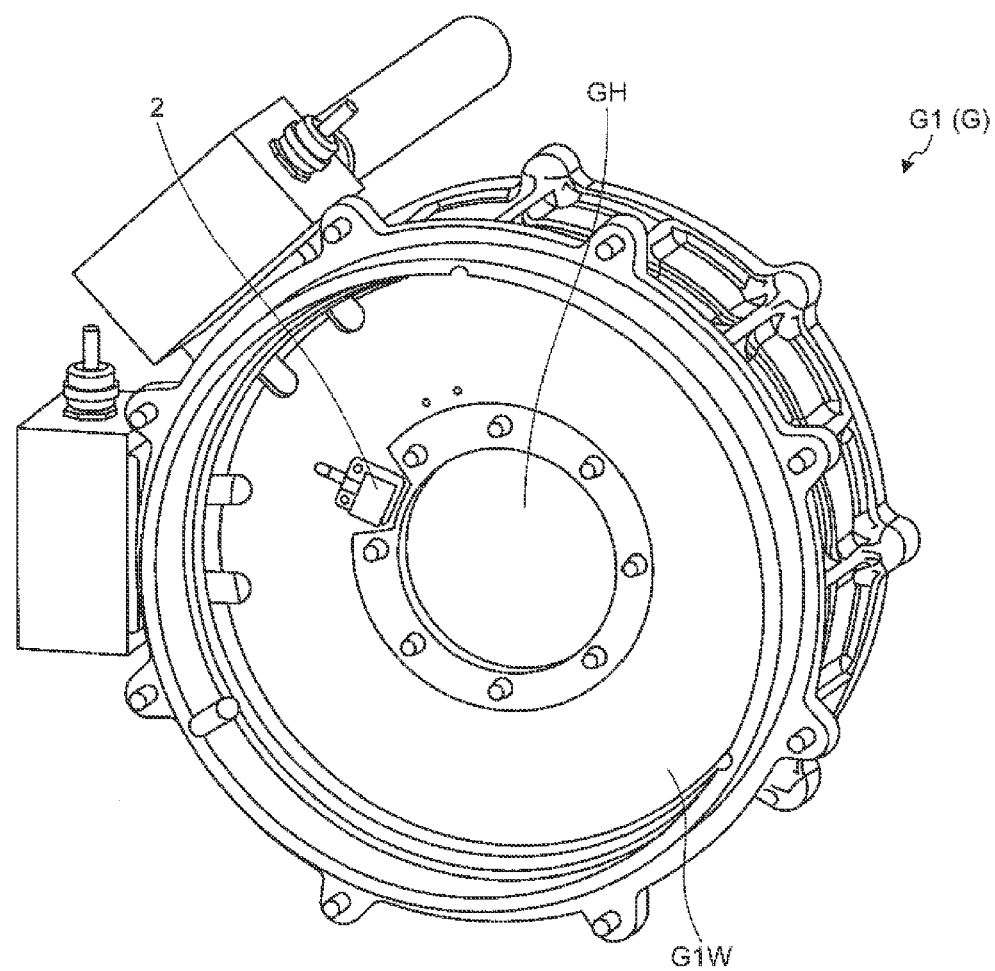

FIG. 19-1 is a perspective view illustrating the first magnetic pattern ring and the second magnetic pattern ring. FIG. 19-2 is a cross-sectional view of A-A of FIG. 19-1. FIG. 19-3 is a perspective view illustrating the arrangement of the magnetic detector. As illustrated in FIG. 19-1, the first magnetic pattern ring 11d and the second magnetic pattern ring 12d are annular members, and have an opening portion MH formed at the center portion thereof. The sun gear shaft 14 illustrated in FIG. 6 penetrates the opening portion MH.

In the electric vehicle driving device 10 illustrated in FIGS. 1 and 6, the first planetary gear mechanism 20 and the second planetary gear mechanism 30 are disposed at the inside of the radial direction of the first rotor 11c of the first motor 11 and the second rotor 12c of the second motor 12. For this reason, it is difficult to use a small-diameter resolver as a rotation angle detection sensor particularly in the motor (the second motor 12) on the side of the vehicle wheel H. It is not desirable to use a large-diameter resolver due to an increase in weight.

As illustrated in FIG. 19-2, the first magnetic pattern ring 11d and the second magnetic pattern ring 12d are obtained by forming a thin magnet layer MP on a surface of an annular thin metal plate BM. The metal plate BM is, for example, aluminum alloy, carbon steel, or the like. The magnet layer MP is, for example, a resin such as plastic or rubber containing magnetic particles. A magnetic pattern is applied to the magnet layer MP. With such a structure, the first magnetic pattern ring 11d and the second magnetic pattern ring 12d may be drastically decreased in weight even when the diameters thereof are large.

A magnetic detector (a magnetic pickup sensor) 2 illustrated in FIG. 19-3 is provided for each of the first magnetic pattern ring 11d and the second magnetic pattern ring 12d, and they are attached to the inside of the first casing G1 of the casing G. The magnetic detector 2 is disposed at both sides of the partition wall G1W of the first casing G1 and the outside of a penetration hole GH provided in the partition wall G1W. The sun gear shaft 14 illustrated in FIG. 6 penetrates the penetration hole GH. With such a structure, the respective magnetic detectors 2 are arranged so as to face the first magnetic pattern ring 11d and the second magnetic pattern ring 12d. In FIG. 19-3, only one magnetic detector 2 is illustrated, but another magnetic detector 2 is further disposed in rear of the partition wall G1W.

The respective magnetic detectors 2 detect the magnetic fluxes of the first magnetic pattern ring 11d and the second magnetic pattern ring 12d, and calculates the absolute angles of the first rotor 11c of the first motor 11 and the second rotor 12c of the second motor 12. For example, the first magnetic pattern ring 11d and the second magnetic pattern ring 12d are magnetized so that the magnetic flux density changes in a sine shape. In the first magnetic pattern ring 11d and the second magnetic pattern ring 12d, the number of periods of the sine wave for one round is equal to the number of pairs of poles of each of the first motor 11 and the second motor 12. That is, one period of the sine wave pattern corresponds to a pair of poles.

Inside the magnetic detector 2, for example, two linear hall sensors are installed, and the respective linear hall sensors are arranged at positions where the phase is deviated by 90° with respect to the sine wave pattern of one period. When two linear hall sensors detect and calculate the magnetic flux density of the first magnetic pattern ring 11d or the second magnetic pattern ring 12d, the absolute angle of the sine wave pattern of one period may be detected. The control device 1 illustrated in FIG. 1 controls a current flowing to the first coil 11b and the second coil 12b based on the absolute angle (the electric angle of a pair of poles) of the first rotor 11c of the first motor 11 and the second rotor 12c of the second motor 12 detected by the magnetic detector 2.

In order to reduce an influence of the leakage magnetic fluxes from the first motor 11 and the second motor 12, the following method may be used. In the first magnetic pattern ring 11d and the second magnetic pattern ring 12d, a magnetization pattern as a magnetic flux density distribution having a rectangular wave shape is formed separately from the continuous magnetic pattern. The period of the magnetization pattern of the rectangular wave shape becomes sufficiently minute. Further, the magnetic detector 2 includes a magnetic sensor which detects the magnetic direction of the rectangular wave pattern and outputs pulses, separately from the linear hall sensor.

First, when no current is supplied to the first motor 11 and the second motor 12 (for example, when the electric vehicle is started), the magnetic detector 2 detects the absolute angles of the first rotor 11c and the second rotor 12c by the continuous magnetic pattern. Subsequently, the magnetic detector 2 calculates the absolute angles of the first rotor 11c and the second rotor 12c by accumulating the relative rotations of the first rotor 11c and the second rotor 12c detected from the magnetization pattern of the rectangular wave shape. The detection of the relative angles of the first rotor 11c and the second rotor 12c due to the magnetization pattern of the rectangular wave shape has high reliability with respect to the magnetic noise compared to the measurement of the absolute angle using the linear hall sensor. For this reason, when the above-described method is used, it is possible to improve the reliability when the magnetic detector 2 detects the absolute angles of the first rotor 11c and the second rotor 12c. Next, the control when the electric vehicle driving device 10 is used in the electric vehicle will be described.

Figure 20:
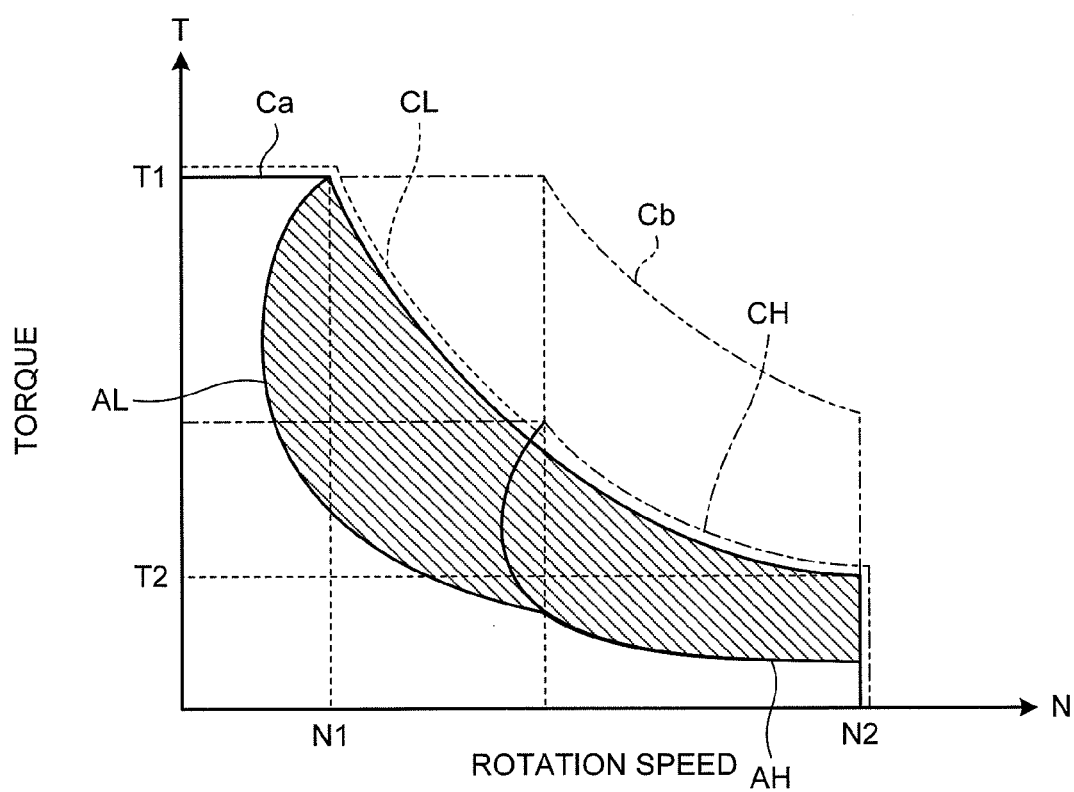
FIG. 20 is a diagram illustrating a relation between a rotational force (torque) and an angular velocity (rotation speed) which are demanded in a motor for running a vehicle.

FIG. 20 is a diagram illustrating a relation between a rotational force (torque) and an angular velocity (rotation speed) which are demanded in the motor which causes the vehicle to run. In general, as for the relation between the rotational force (torque) and the angular velocity (rotation speed) of the motor, a ratio between the upper-limit rotation speed in a region of a uniform rotational force and the maximum rotation speed is about 1:2. Further, a ratio between the maximum rotational force and the maximum rotational force at the maximum rotation speed is about 2:1. Here, in a case where the vehicle runs, a ratio between the upper-limit rotation speed in a region of a uniform rotational force and the maximum rotation speed is 1:4 from a vehicle running characteristic curve Ca indicated by the solid line of FIG. 20. Further, in a case where the vehicle runs, a ratio between the maximum rotational force and the maximum rotational force at the maximum rotation speed is about 4:1.

Accordingly, in a case where the vehicle runs by the motor, it is desirable to perform a speed change operation in which a ratio (a difference between the stages) between the first stage speed change ratio and the second stage speed change ratio is about 2. With such a configuration, it is possible to cover the vehicle running characteristic curve Ca without any excess and deficiency in the entire region of the NT characteristic (the relation between the rotation speed and the rotational force) of the motor, and to ensure a power performance necessary for the vehicle by the motor having an essentially demanded minimum output.

The NT characteristic curve CL which is indicated by the dotted line of FIG. 20 is the first speed change state (the low gear) of the electric vehicle driving device 10, and the NT characteristic curve CH which is indicated by the one-dotted chain line is the second speed change state (the high gear) of the electric vehicle driving device 10. In this way, it is possible to cover the vehicle running characteristic curve Ca without any excess and deficiency by using the first speed change state and the second speed change state. The NT characteristic curve Cb which is indicated by the two-dotted chain line represents the NT characteristics which are necessary when covering the vehicle running characteristic curve Ca without performing a speed change operation. In general, in the motor, since a ratio between the upper-limit rotation speed in a region of a constant rotational force and the maximum rotation speed is about 1:2, the motor needs to have the characteristics of the NT characteristic curve Cb when covering the running characteristic curve Ca by one motor. As a result, an excessive performance is needed for the motor, so that waste increases and an increase in cost and weight is caused.

When the efficiency of the motor is taken into consideration, the region where the efficiency of the motor is high is present at the intermediate portions AL and AH of the constant output region (the curved portion of the NT characteristic curve CL or the NT characteristic curve CH) which changes from the maximum rotational force toward the maximum rotation speed. The electric vehicle driving device 10 may improve the efficiency by actively using the intermediate portions AL and AH though the speed change operation. When the speed change operation is not performed, the motor having the NT characteristic curve Cb is needed. However, in this case, the efficiency of the motor becomes highest in a region (for example, a region where the high rotational force is needed at the low speed or a region near the maximum speed) where a frequency of use in the running characteristic curve Ca is low. For this reason, from the view point of efficiently using the motor, it is desirable to use the speed reduction ratio by changing the ratio as in the electric vehicle driving device 10.

When the first motor 11 and the second motor 12 are both operated by the electric vehicle driving device 10, the total speed reduction ratio R of the speed change mechanism 13 becomes $(\alpha+\beta-1)/(\alpha-\beta-1)$. This is only in the first speed change state, and R=1 in the second speed change state. $\alpha$ indicates a planetary ratio of the second planetary gear mechanism 30, and β indicates a planetary ratio of the first planetary gear mechanism 20. The planetary ratio is a value which is obtained by dividing the number of teeth of the ring gear by the number of teeth of the sun gear. Accordingly, the planetary ratio α of the second planetary gear mechanism 30 is the number of teeth of the second ring gear 34/the number of teeth of the second sun gear 31, and the planetary ratio β of the first planetary gear mechanism 20 is the number of teeth of the first ring gear 24/the number of teeth of the first sun gear 21. In order to realize a difference in stage of 2 using the electric vehicle driving device 10 illustrated in FIG. 1, it is desirable that the planetary ratio α (>1) of the second planetary gear mechanism 30 is set to a range from 1.90 to 2.10, and a planetary ratio β (>1) of the first planetary gear mechanism 20 is set to a range from 2.80 to 3.20.

Since the electric vehicle driving device 10 is disposed below the spring of the electric vehicle, the light weight is desirable as much as possible. In order to decrease the weight of the electric vehicle driving device 10, there is a known method of using aluminum (including aluminum alloy) in the coil (the first coil 11b and the second coil 12b) of the first motor 11 and the second motor 12. Since the specific weight of aluminum is about 30% of the specific weight of copper, when the coils of the first motor 11 and the second motor 12 are changed from copper to aluminum, the weight of the coil may be decreased by 70%. For this reason, the first motor 11, the second motor 12, and the electric vehicle driving device 10 may be decreased in weight. However, since the conductivity of aluminum is generally about 60% of the conductivity of the copper used in the coil, when the copper wire is just changed to the aluminum wire, degradation in performance and an increase in heating amount may be caused.

The electric vehicle driving device 10 uses the speed reduction mechanism 40, and changes the speed reduction ratio by the speed change mechanism 13. For this reason, since the rotational forces which are necessary for the first motor 11 and the second motor 12 are comparatively small, the current flowing to the first motor 11 and the second motor 12 also decreases. For this reason, in the embodiment, even when the aluminum wire is used in the first coil 11b of the first motor 11 and the second coil 12b of the second motor 12 instead of the copper wire, degradation in performance and an increase in heating amount hardly occur. Accordingly, in the embodiment, the electric vehicle driving device 10 realizes a decrease in weight by using aluminum (including aluminum alloy) in the coils (the first coil 11b and the second coil 12b) of the first motor 11 and the second motor 12.

When aluminum is used in the coils of the first motor 11 and the second motor 12, it is desirable to use a copper clad aluminum wire. The copper clad aluminum wire is obtained in a manner such that copper is uniformly coated on the outside of the aluminum wire and the boundary between the copper and the aluminum is rigidly metal-bonded. Compared to the aluminum wire, the copper clad aluminum wire may be easily soldered and has excellent reliability of the connection portion with the terminal. Since the specific weight of the copper clad aluminum is about 40% of the specific weight of the copper, when the coils of the first motor 11 and the second motor 12 are changed from the copper to the aluminum, the weight of the coil may be decreased by 60%. As a result, the first motor 11, the second motor 12, and the electric vehicle driving device 10 may be decreased in weight.

Figure 21:
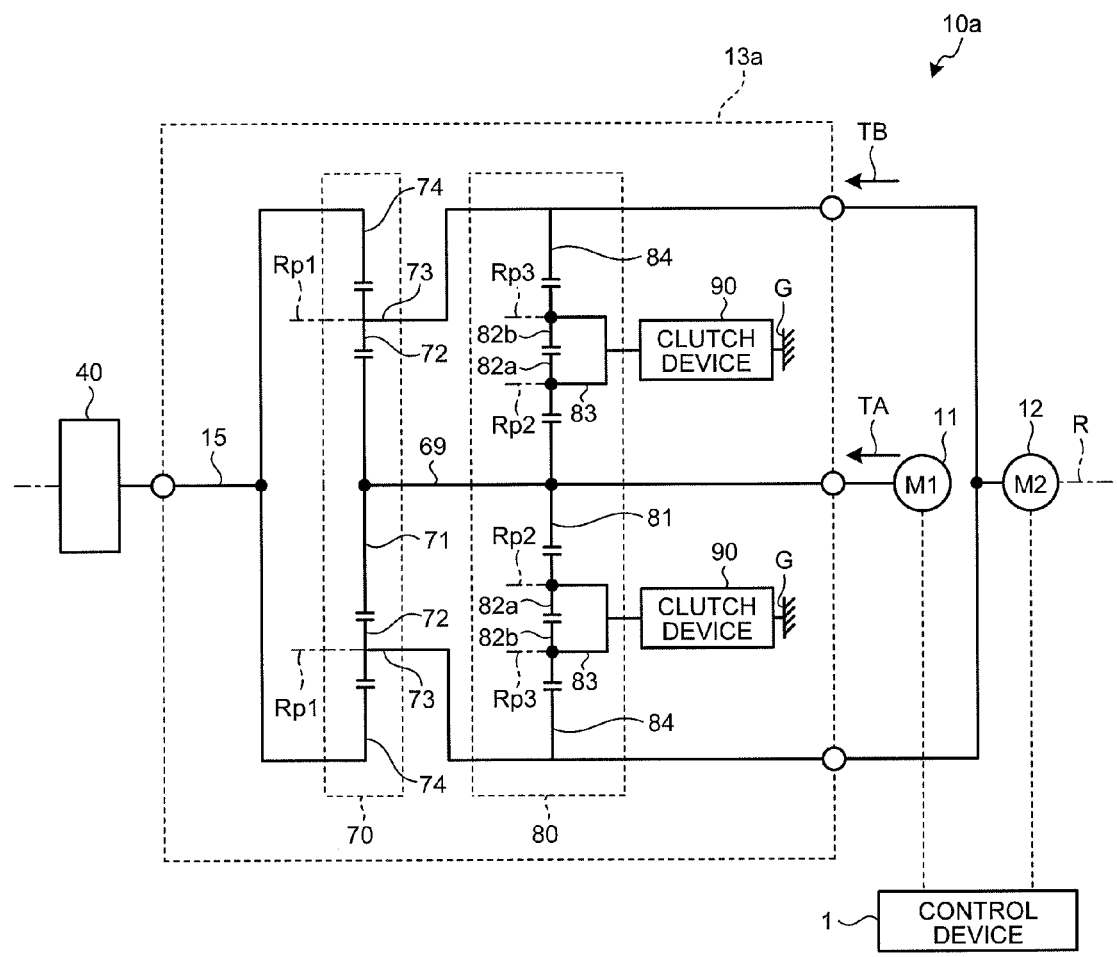
FIG. 21 is a diagram illustrating a configuration of an electric vehicle driving device according to a modified example of the embodiment.

FIG. 21 is a diagram illustrating a configuration of an electric vehicle driving device according to a modified example of the embodiment. An electric vehicle driving device 10a illustrated in FIG. 21 has a configuration different from that of the speed change mechanism of the electric vehicle driving device 10 of the above-described embodiment. Hereinafter, the same reference numerals will be given to the components of the electric vehicle driving device 10, and the description thereof will not be repeated. The electric vehicle driving device 10a includes a speed change mechanism 13a. The speed change mechanism 13a is connected to the first motor 11, and the rotational force output from the first motor 11 is transmitted (input) thereto. Further, the speed change mechanism 13a is connected to the second motor 12, and the rotational force output from the second motor 12 is transmitted (input) thereto. Then, the speed change mechanism 13a is connected to the speed reduction mechanism 40 by the speed change mechanism input-and-output shaft 15, and the rotational force subjected to the speed change operation is transmitted (input) to the speed reduction mechanism 40. The speed reduction mechanism 40 is the same as that provided in the electric vehicle driving device 10.

The speed change mechanism 13a includes a first planetary gear mechanism 70, a second planetary gear mechanism 80, and a clutch device 90. The first planetary gear mechanism 70 is a single pinion type planetary gear mechanism. The first planetary gear mechanism 70 includes a first sun gear 71, a first pinion gear 72, a first carrier 73, and a first ring gear 74. The second planetary gear mechanism 80 is a double pinion type planetary gear mechanism. The second planetary gear mechanism 80 includes a second sun gear 81, a second pinion gear 82a, a third pinion gear 82b, a second carrier 83, and a second ring gear 84. The second planetary gear mechanism 80 is disposed on the side of the first motor 11 and the second motor 12 in relation to the first planetary gear mechanism 70.

The second sun gear 81 is supported inside the casing G so as to rotate (turn) about the rotation shaft R. The second sun gear 81 is connected to the first motor 11. Accordingly, when the first motor 11 is operated, the first rotational force TA is transmitted to the second sun gear 81. Accordingly, when the first motor 11 is operated, the second sun gear 81 rotates about the rotation shaft R. The second pinion gear 82a meshes with the second sun gear 81. The third pinion gear 82b meshes with the second pinion gear 82a. The second carrier 83 supports the second pinion gear 82a so that the second pinion gear 82a rotates (turns) about the second pinion rotation shaft Rp2. The second carrier 83 holds the third pinion gear 82b so that the third pinion gear 82b rotates (turns) about the third pinion rotation shaft Rp3. The second pinion rotation shaft Rp2 is parallel to, for example, the rotation shaft R. The third pinion rotation shaft Rp3 is parallel to, for example, the rotation shaft R.

The second carrier 83 is supported inside the casing G so as to rotate about the rotation shaft R. Accordingly, the second carrier 83 holds the second pinion gear 82a and the third pinion gear 82b so that the second pinion gear 82a and the third pinion gear 82b may revolve about the second sun gear 81, that is, the rotation shaft R. The second ring gear 84 may rotate (turn) about the rotation shaft R. The second ring gear 84 meshes with the third pinion gear 82b. Further, the second ring gear 84 is connected to the second motor 12. Accordingly, when the second motor 12 is operated, the second rotational force TB is transmitted to the second ring gear 84. Accordingly, when the second motor 12 is operated, the second ring gear 84 rotates (turns) about the rotation shaft R.

The first sun gear 71 is supported inside the casing G so as to rotate (turn) about the rotation shaft R. The first sun gear 71 is connected to the first motor 11 through the second sun gear 81. Specifically, the first sun gear 71 and the second sun gear 81 are integrally formed with the sun gear shaft 69 so as to rotate about the same shaft (the rotation shaft R). Then, the sun gear shaft 69 is connected to the first motor 11. Accordingly, when the first motor 11 is operated, the first sun gear 71 rotates about the rotation shaft R.

The first pinion gear 72 meshes with the first sun gear 71. The first carrier 73 holds the first pinion gear 72 so that the first pinion gear 72 may rotate (turn) about the first pinion rotation shaft Rp1. The first pinion rotation shaft Rp1 is parallel to, for example, the rotation shaft R. The first carrier 73 is supported inside the casing G so as to rotate about the rotation shaft R. Accordingly, the first carrier 73 holds the first pinion gear 72 so that the first pinion gear 72 may revolve about the first sun gear 71, that is, the rotation shaft R.

Further, the first carrier 73 is connected to the second ring gear 84. Accordingly, when the second ring gear 84 rotates (turns), the first carrier 73 rotates (turns) about the rotation shaft R. The first ring gear 74 meshes with the first pinion gear 72. Further, the first ring gear 74 is connected to the third sun gear 41 (see FIG. 1) of the speed reduction mechanism 40. With such a structure, when the first ring gear 74 rotates (turns), the third sun gear 41 of the speed reduction mechanism 40 rotates. The clutch device 90 may regulate the rotation of the second carrier 83 as in the clutch device 60 provided in the electric vehicle driving device 10 illustrated in FIG. 1. Specifically, the clutch device 90 may switch a case where the rotation of the second carrier 83 about the rotation shaft R is regulated (braked) and a case where the rotation is permitted. The electric vehicle driving device 10a has the same effect as that of the electric vehicle driving device 10 by the principle of the above-described electric vehicle driving device 10.

REFERENCE SIGNS LIST 10, 10a: electric vehicle driving device
11, M1: first motor
11a: first stator core
11b: first coil
11c: first rotor
11c1: first rotor core
11c2: first magnet
11d: first magnetic pattern ring
11e: first motor output shaft
12, M2: second motor
12a: second stator core
12b: second coil
12c: second rotor
12c1: second rotor core
12c2: second magnet
12d: second magnetic pattern ring
13, 13a: speed change mechanism
14, 69: sun gear shaft
20, 70: first planetary gear mechanism
21, 71: first sun gear
22, 72: first pinion gear
23, 73: first carrier
24, 74: first ring gear
30, 80: second planetary gear mechanism
31, 81: second sun gear
32a, 82a: second pinion gear
32b, 82b: third pinion gear
33, 83: second carrier
34, 84: second ring gear
40: speed reduction mechanism (final gear)
41: third sun gear
42: fourth pinion gear
43: third carrier
44: third ring gear
45, 46: bearing
50: wheel bearing (hub bearing)
60, 90: clutch device
101: inner race portion
102: outer race portion
103: rolling element
104: stud bolt
106: nut
111: first inner race member
112: second inner race member
113: locking nut
114a, 114b: retainer
115a, 115b: steel ball
116: outer race member
117: wheel flange
118: fixation bolt
131: tooth groove
132, 142, 154, 155: concave surface
133, 152, 172, 174: bolt hole
134: male screw
141: female screw
143, 176: hole
151, 171: contact surface
151a, 171a: outer radial side contact surface
151b, 171b: inner radial side contact surface
153, 173: step
161: body
162: flange
163: cylindrical portion
175: concave portion
G: casing
G1: first casing
G2: second casing
G3: third casing
G4: fourth casing
H: vehicle wheel
Hw: wheel
R: rotation shaft
Rp1: first pinion rotation shaft
Rp2: second pinion rotation shaft
Rp3: third pinion rotation shaft
Rp4: fourth pinion rotation shaft
T1, T7, TA: first rotational force
T2: synthetic rotational force
T3: circulation rotational force
T4: second distributed rotational force
T5, T8, TB: second rotational force
T6: first distributed rotational force
T9: synthetic rotational force
Z1, Z4, Z5, Z7: number of teeth

The invention claimed is:

1. A hub bearing which is connected to a wheel and a support mechanism and supports the wheel to the support mechanism so as to be rotatable about a rotation shaft, the hub bearing comprising:
   an inner race portion which is fixed to the support mechanism;
   an outer race portion which is connected to the wheel; and
   a rolling element which is disposed between the inner race portion and the outer race portion and supports the outer race portion and the inner race portion so as to be relatively rotatable about the rotation shaft,
   wherein the outer race portion includes an outer race member which comes into contact with the rolling element, a wheel flange which is connected to the wheel, and a fixation mechanism which fixes the outer race member to the wheel flange, wherein the inner race portion includes a first inner race member which is fixed to the support mechanism, a second inner race member which is inserted into the outer peripheral surface of the first inner race member, and a locking nut which is disposed on the outer peripheral surface of the first inner race member so as to be near the wheel in relation to the second inner race member and is threaded into the first inner race member, wherein the end surface of the locking nut away from the wheel in a direction parallel to the rotation shaft is positioned near the wheel in relation to the contact surface of the outer race member against the wheel flange, wherein the hub bearing further comprises: a plurality of fastening members which connects the wheel flange to the wheel, wherein the wheel flange is provided with a plurality of openings into which the fastening members are inserted, and a pitch circle diameter connecting the respective centers of the plurality of openings is smaller than a pitch circle diameter connecting the centers of the rolling elements in the radial direction perpendicular to the rotation shaft.

2. The hub bearing according to claim 1, wherein the outer race portion includes an outer race member which comes into contact with the rolling element, a wheel flange which is connected to the wheel, and a fixation mechanism which fixes the outer race member to the wheel flange, and wherein the end surface of the wheel flange away from the outer race member in a direction parallel to the rotation shaft extends to the rotation shaft in relation to the inner race portion in the radial direction of the rotation shaft.

3. The hub bearing according to claim 1, wherein the fixation mechanism is a fixation bolt of which a shaft portion extends in a direction parallel to the rotation shaft.

4. The hub bearing according to claim 3, wherein in the wheel flange, a head portion of the fixation bolt is accommodated.

5. The hub bearing according to claim 1, wherein the wheel flange includes a convex protrusion portion which is provided in the contact surface against the outer race member so as to be directed to the outer race member.

6. The hub bearing according to claim 5, wherein the wheel flange is made of a material having a higher linear expansion coefficient than that of the outer race member, and wherein the protrusion portion is formed at the inside in relation to the end portion of the contact surface in a direction perpendicular to the rotation shaft.

7. The hub bearing according to claim 1, wherein the fastening member is a stud bolt which extends in a direction parallel to the rotation shaft and of which a head portion is exposed to the surface of the wheel flange near the inner race portion.

8. A speed reduction mechanism comprising:
the hub bearing according to claim 1,
a sun gear to which a driving force is transmitted from a driving source; and
a pinion gear which meshes with the sun gear,
wherein the wheel flange is a carrier which holds the pinion gear and rotates about the rotation shaft along with the pinion gear, and
wherein the inner race portion is a ring gear which meshes with the pinion gear.

9. An in-wheel motor comprising:
the speed reduction mechanism according to claim 8;
a transmission mechanism which is connected to the sun gear of the speed reduction mechanism and rotates the sun gear; and
a driving source which includes at least one motor generating a driving force to rotate the transmission mechanism.

10. The in-wheel motor according to claim 9, wherein the driving source includes a first motor and a second motor,
wherein the transmission mechanism includes
a first sun gear which is connected to the first motor,
a first pinion gear which meshes with the first sun gear,
a first carrier which holds the first pinion gear so that the first pinion gear rotates and the first pinion gear revolves about the first sun gear,
a clutch device which regulates the rotation of the first carrier,
a first ring gear which meshes with the first pinion gear and is connected to the second motor,
a second sun gear which is connected to the first motor,
a second pinion gear which meshes with the second sun gear,
a third pinion gear which meshes with the second pinion gear,
a second carrier which holds the second pinion gear and the third pinion gear so that the second pinion gear and the third pinion gear respectively rotate and the second pinion gear and the third pinion gear revolve about the second sun gear and is connected to the first ring gear, and
a second ring gear which meshes with the third pinion gear and is connected to the sun gear of the speed reduction mechanism.

11. The in-wheel motor according to claim 9, wherein the driving source includes a first motor and a second motor,
wherein the transmission mechanism includes
a first sun gear which is connected to the first motor,
a first pinion gear which meshes with the first sun gear,
a first carrier which holds the first pinion gear so that the first pinion gear rotates and the first pinion gear revolve about the first sun gear,
a first ring gear which meshes with the first pinion gear and is connected to the sun gear of the speed reduction mechanism,
a second sun gear which is connected to the first motor,
a second pinion gear which meshes with the second sun gear,
a third pinion gear which meshes with the second pinion gear,
a second carrier which holds the second pinion gear and the third pinion gear so that the second pinion gear and the third pinion gear respectively rotate and the second pinion gear and the third pinion gear revolve about the second sun gear,
a clutch device which regulates the rotation of the second carrier, and
a second ring gear which meshes with the third pinion gear, is connected to the first carrier, and is connected to the second motor.

12. The in-wheel motor according to claim 10, wherein the clutch device includes
a first member;
a second member which is rotatable with respect to the first member; and an engagement member which transmits a rotational force between the first member and the second member when a rotational force acts on the second member in a first direction, and does not transmits a rotational force between the first member and the second member when a rotational force acts on the second member in a second direction opposite to the first direction.

13. The in-wheel motor according to claim 12,
wherein the one-way clutch device is disposed in an engagement direction when the first motor rotates in a direction in which the electric vehicle equipped with the in-wheel motor advances and the second motor is not driven.

14. The in-wheel motor according to claim 13,
wherein the clutch device is a sprag type one-way clutch.

15. An in-wheel motor comprising:
a first motor;
a second motor;
a first sun gear which is connected to the first motor;
a first pinion gear which meshes with the first sun gear;
a first carrier which holds the first pinion gear so that the first pinion gear rotates and the first pinion gear revolves about the first sun gear;
a clutch device which regulates the rotation of the first carrier;
a first ring gear which meshes with the first pinion gear and is connected to the second motor;
a second sun gear which is connected to the first motor;
a second pinion gear which meshes with the second sun gear;
a third pinion gear which meshes with the second pinion gear;
a second carrier which holds the second pinion gear and the third pinion gear so that the second pinion gear and the third pinion gear respectively rotate and the second pinion gear and the third pinion gear revolve about the second sun gear and is connected to the first ring gear;
a second ring gear which meshes with the third pinion gear;
a third sun gear which is connected to the second ring gear;
a fourth pinion gear which meshes with the third sun gear;
a third carrier which holds the fourth pinion gear so that the fourth pinion gear rotates and the fourth pinion gear revolves about the third sun gear and is connected to the vehicle wheel of the electric vehicle, and
a third ring gear which meshes with the fourth pinion gear and is fixed to a stationary system.

16. An in-wheel motor comprising:
a first motor;
a second motor;
a first sun gear which is connected to the first motor;
a first pinion gear which meshes with the first sun gear;
a first carrier which holds the first pinion gear so that the first pinion gear rotates and the first pinion gear revolves about the first sun gear;
a first ring gear which meshes with the first pinion gear;
a second sun gear which is connected to the first motor;
a second pinion gear which meshes with the second sun gear;
a third pinion gear which meshes with the second pinion gear;
a second carrier which holds the second pinion gear and the third pinion gear so that the second pinion gear and the third pinion gear respectively rotate and the second pinion gear and the third pinion gear revolve about the second sun gear;
a clutch device which regulates the rotation of the second carrier;
a second ring gear which meshes with the third pinion gear, is connected to the first carrier, and is connected to the second motor;
a third sun gear which is connected to the first ring gear;
a fourth pinion gear which meshes with the third sun gear;
a third carrier which holds the fourth pinion gear so that the fourth pinion gear rotates and the fourth pinion gear revolves about the third sun gear and is connected to a vehicle wheel of an electric vehicle; and
a third ring gear which meshes with the fourth pinion gear and is fixed to a stationary system.

* * * * *